(12) United States Patent
Popa et al.

(10) Patent No.: US 12,423,366 B2
(45) Date of Patent: Sep. 23, 2025

(54) DETERMINING SEARCH ENGINE VISIBILITY METRICS FOR A WEBSITE

(71) Applicant: Siteimprove A/S, Copenhagen (DK)

(72) Inventors: Andrei-Gheorghe Popa, Copenhagen (DK); Jonas Bjerregaard Nielsen, Copenhagen (DK)

(73) Assignee: Siteimprove A/S, Copenhagen (DK)

( * ) Notice: Subject to any disclaimer, the term of this patent is extended or adjusted under 35 U.S.C. 154(b) by 0 days.

(21) Appl. No.: 18/912,208

(22) Filed: Oct. 10, 2024

(65) Prior Publication Data

US 2025/0252140 A1 Aug. 7, 2025

Related U.S. Application Data

(60) Provisional application No. 63/627,858, filed on Feb. 1, 2024.

(51) Int. Cl.
*G06F 16/2457* (2019.01)
*G06F 16/953* (2019.01)

(52) U.S. Cl.
CPC ...... *G06F 16/953* (2019.01); *G06F 16/24578* (2019.01)

(58) Field of Classification Search
CPC .......... G06F 16/24578; G06F 16/953
See application file for complete search history.

(56) References Cited

U.S. PATENT DOCUMENTS

| | | |
|---|---|---|
| 8,606,769 B1 | 12/2013 | Berry |
| 9,152,678 B1 | 10/2015 | McDonnell |
| 2004/0019588 A1 | 1/2004 | Doganata et al. |
| 2014/0164345 A1 | 6/2014 | Connolly et al. |
| 2019/0073365 A1 | 3/2019 | Jamshidi |
| 2020/0104411 A1* | 4/2020 | Francis ............... G06F 16/3334 |
| 2023/0140454 A1 | 5/2023 | Ilker et al. |

(Continued)

OTHER PUBLICATIONS

Competitor Analysis Tools, Serpstat.com, accessed on Oct. 11, 2024 at https://serpstat.com/competitor-analysis/?_gl=1*1kog6os*_up*MQ..*_ga*MTY2MjUOODQzLjE3Mjg2NDM4NTQ.*_ga_E2HH4M9M7F*MTcyODY0Mzg1My4xLjEuMTcyODY0Mzg2MC4wLjAuMA..*_ga_DNKCKDTH13*MTcyODY0Mzg1My4xLjEuMTcyODY0Mzg2MC4wLjAuMTg5MDM1Mzc1OQ..*_ga_GDW29WTKPZ*MTcyODY0Mzg1My4xLjEuMTcyODY0Mzg2MC4wLjAuMTI0ODQ5NTI4OQ, 5 pages.

(Continued)

*Primary Examiner* — Hau H Hoang
(74) *Attorney, Agent, or Firm* — Barnes & Thornburg LLP

(57) ABSTRACT

Disclosed are techniques for determining search engine visibility (SEV) metrics for a target website. A computer system can: obtain a group of keywords for the website, for each keyword: poll a third party data analytics provider for keyword information, receive the information including keyword position data and search volume data, identify a click-through-rate (CTR) for the keyword based on processing the keyword position data and the search volume data, determine a SEV score for the keyword based on: determining an estimated number of clicks for the keyword based on the keyword position data, the search volume data, and the CTR, determining a gamification value based on a logarithmic relationship between the keyword position data and the search volume data, and determining the SEV score based on the estimated number of clicks and the gamification value, then combine the SEV scores to generate a composite SEV score for the website.

26 Claims, 14 Drawing Sheets

(56) References Cited

U.S. PATENT DOCUMENTS

2023/0146998 A1 5/2023 Toth
2023/0153367 A1 5/2023 Stroier et al.

OTHER PUBLICATIONS

Valeriia Lokhtenko, "Search Engine Visibility: How to Check and Increase It", Serpstat.com, Mar. 2, 2023, accessed on Oct. 11, 2024 at https://serpstat.com/blog/how-to-analyze-the-visibility-of-the-website/, 8 pages.

* cited by examiner

DETERMINING SEARCH ENGINE VISIBILITY METRICS FOR A WEBSITE

INCORPORATION BY REFERENCE

This application claims the priority benefit of U.S. Provisional Patent Application No. 63/627,858, filed Feb. 1, 2024, the entire contents of which are incorporated herein by reference.

TECHNICAL FIELD

This disclosure generally describes systems, methods, and techniques related to computer-automated determination and evaluation of keyword ranking and search volume for a website,

BACKGROUND

Websites can be created with one or more keywords. Keywords can help a website rank in search results. The keywords can be included, linked, and/or mapped to pages of the website to match search terms that end users may use to find websites using search engines. Using keywords strategically can therefore help search engines find the website site as relevant to end users. The keywords can also provide insight into what end users are searching for and content that can be added or otherwise provided in the website to meet the end users' needs.

SUMMARY

The disclosure generally describes technology for computer-automated search engine visibility (SEV) for a target website. SEV can be a measure of traffic to the target website. A high SEV, for example, can indicate high organic traffic to the target website. More particularly, the disclosed technology can provide for evaluating, scoring, and providing visibility into organic rankings of keywords for a target website, such as in the form of one or more SEV scores. The SEV score(s) can be determined using one or more algorithms for a keyword, a set of keywords, and/or an activity plan (e.g., a workflow for engaging with different aspects of search engine optimization (SEO) to achieve and maintain the target website goals) associated with the target website. The algorithms can use inputs such as search volume data, keyword ranking or position data, and/or click-through-rate (CTR) data to generate and output the SEV score(s). The algorithms may further use gamification metrics and/or techniques to generate an SEV score that is understandable and digestible by users associated with the target website. The disclosed technology can also provide competitor analysis and historical analysis for the target website with respect to the SEV score(s) to allow for benchmarking and improvement in keyword selection and other improvements to the target website.

As an illustrative example, the disclosed technology can provide for generating one or more SEV scores for the target website using one or more algorithms. The algorithm(s) can combine data about the keyword(s), such as search volume, ranking/position, and/or CTR, using one or more weights. The algorithm(s) can also determine a gamification metric based on a logarithmic relationship between the search volume and the ranking/position data. Then, the algorithm(s) can generate the SEV score(s) based on the combined data and the gamification metric. The disclosed technology can also provide for combining various SEV scores as part of a keyword grouping and/or activity plan for the target website. Sometimes, SEV scores that are associated with positions greater than a predetermined threshold level (e.g., position 11 or greater) may be weighted less and thus contribute marginally to the combined SEV score.

The disclosed technology further can provide graphical user interfaces (GUIs) for presentation at client computing devices (e.g., computing devices of users associated with the target website) that illustrate the SEV score(s) for the target website and other relevant information. For example, the GUIs can illustrative comparisons of combined SEV scores for a particular keyword grouping and/or activity plans of the target website. Such comparisons can be made against historic SEV scores associated with the target website. Such comparisons can be made against competitors of the target website. The GUIs can visually depict baseline values, such as search volume, as a way to gauge whether changes in the SEV score(s) for the target website and/or competitors are due to improved SEO performance, search volume, or other factors. The GUIs may also depict a breakdown of individual keyword SEV scores that may form the combined SEV score(s). The GUIs may include an interface for readily identifying and adding additional or other keywords to the keyword grouping and/or the activity plan(s) for combined SEV score determination, such as through a keyword discovery tool. The GUIs may also include features for determining and presenting historical comparisons against competitors for newly added keywords (e.g., not limited to presenting only the SEV scores for keywords from a date of addition to the keyword grouping and/or the activity plan(s)).

One or more embodiments described herein can include a system for determining search engine visibility (SEV) metrics for a target website, the system including: a computer system that can be configured to determine SEV metrics for a target website over one or more time periods, the computer system being configured to perform operations that may include: obtaining a group of keywords for the target website from a data store or a client computing device associated with the target website, and for each keyword in the group of keywords: polling a third party data analytics provider for information associated with at least the keyword, receiving, based on the polling and from the third party data analytics provider, the information associated with at least the keyword, the received information including keyword position data and search volume data, identifying a click-through-rate (CTR) for the keyword based on processing the keyword position data and the search volume data, determining a SEV score for the keyword based on a process including: determining an estimated number of clicks for the keyword based on the keyword position data, the search volume data, and the CTR, determining a gamification value based on a logarithmic relationship between the keyword position data and the search volume data, and determining the SEV score based on the estimated number of clicks and the gamification value. The operations can also include combining the SEV scores for the group of keywords to generate a composite SEV score for the target website, and returning the composite SEV score for the target website.

In some implementations, the embodiments described herein can optionally include one or more of the following features. Returning the composite SEV score can include presenting the composite SEV score in a graphical element in a graphical user interface (GUI) displayed at the client computing device. Returning the composite SEV score can includ storing the composite SEV score in the data store in association with the target website and a time period for which the composite SEV score is determined. Sometimes, obtaining the group of keywords for the target website can include obtaining the group of keywords for a particular activity plan of the target website, and the composite SEV score can be associated with the particular activity plan of the target website. Returning the composite SEV score for the target website can include presenting a comparison of composite SEV scores across different activity plans for the target website, the composite SEV scores including the composite SEV score associated with the particular activity plan of the target website.

In some implementations, the one or more time periods can include a current time period. The current time period can include a last 30 days. The one or more time periods can include a past time period. The past time period can include a last 3 months.

The operations may also include: determining a SEV score for a competitor website, generating a competitor analysis for the target website based on the composite SEV score and the SEV score for the competitor website, generating output that visually depicts the competitor analysis, and returning the output for presentation in a GUI at the client computing device. The output can include a graph that visually depicts, for the one or more time periods, a change of the composite SEV score for the target website relative a change in the SEV score for the competitor website.

Sometimes, the operations can include: receiving an indication of a triggering event to update a historical analysis of SEV scores for the target website, receiving an indication of a past time period for the historical analysis of the SEV scores, and re-computing one or more of the SEV scores for the target website for the past time period based on at least one of (i) one or more of the SEV scores determined for the group of keywords or (ii) the composite SEV score for the target website. The operations also can include re-computing, based on the re-computed one or more SEV scores for the target website for the past time period, at least one of (i) the one or more of the SEV scores determined for the group of keywords or (ii) the composite SEV score for the target website. The operations may include updating the historical analysis of SEV scores for the target website based on the re-computed one or more SEV scores for the target website for the past time period. Sometimes, the operations can include re-computing one or more SEV scores for a competitor website of the target website for the past time period, and generating a historical competitor analysis between the target website and the competitor website based on the re-computed SEV scores for the target website and the competitor website. The operations can also include storing, in the data store, the re-computed one or more of the SEV scores for the target website in association with the past time period. Sometimes, the system can include the data store, the data store being configured to maintain information about the target website, the information including at least the SEV scores for the group of keywords, time periods for which the SEV scores are determined, and the composite SEV score.

One or more embodiments described herein can include a method for determining search engine visibility (SEV) metrics for a target website, the method including: obtaining, by a computer system, a group of keywords for a target website from a data store or a client computing device associated with the target website, for each keyword in the group of keywords: polling, by the computer system, a third party data analytics provider for information associated with at least the keyword, receiving, by the computer system and based on the polling and from the third party data analytics provider, the information associated with at least the keyword, the received information including keyword position data and search volume data, identifying, by the computer system, a click-through-rate (CTR) for the keyword based on processing the keyword position data and the search volume data, determining, by the computer system, a SEV score for the keyword based on a process including: determining an estimated number of clicks for the keyword based on the keyword position data, the search volume data, and the CTR, determining a gamification value based on a logarithmic relationship between the keyword position data and the search volume data, and determining the SEV score based on the estimated number of clicks and the gamification value, then combining, by the computer system, the SEV scores for the group of keywords to generate a composite SEV score for the target website, and returning, by the computer system, the composite SEV score for the target website.

The method can optionally include one or more of the above-mentioned features and/or one or more of the following features. For example, returning, by the computer system, the composite SEV score can include presenting the composite SEV score in a graphical element in a graphical user interface (GUI) displayed at the client computing device. The method can also include: receiving, by the computer system, an indication of a triggering event to update a historical analysis of SEV scores for the target website, receiving, by the computer system, an indication of a past time period for the historical analysis of the SEV scores, and re-computing, by the computer system, one or more of the SEV scores for the target website for the past time period based on at least one of (i) one or more of the SEV scores determined for the group of keywords or (ii) the composite SEV score for the target website.

One or more embodiments described herein can include a system for determining a search engine visibility (SEV) score for a website, the system including: a computer system that can be configured to perform operations that may include: obtaining a group of keywords associated with the website, for each keyword in the group of keywords: polling a third party data analytics provider for information associated with the keyword, receiving, based on the polling, the information associated with the keyword, identifying a click-through-rate (CTR) for the keyword based on the received information, and determining a SEV score for the keyword. The operations can also include: combining the SEV scores for the group of keywords to generate a composite SEV score for the target website and returning the composite SEV score for the website.

The system can optionally include one or more of the above features and/or one or more of the following features. For example, the received information can include keyword position data and search volume data. Determining the SEV score for the keyword may include: determining an estimated number of clicks for the keyword based on the keyword position data, the search volume data, and the CTR, determining a gamification value based on a logarithmic relationship between the keyword position data and the search volume data, and determining the SEV score based on the estimated number of clicks and the gamification value. The CTR can be identified based on a combination of the keyword position data and the search volume data. The operations may also include: determining a SEV score for a competitor website, generating a competitor analysis for the website based on the composite SEV score and the SEV score for the competitor website, generating output that visually depicts the competitor analysis, and returning the output for presentation in a GUI at a computing device.

The devices, system, and techniques described herein may provide one or more of the following advantages. For example, the disclosed technology provides for accurate SEV evaluation for a target website to understand organic keyword rankings and benchmark against itself and/or against competitors. A user associated with the target website may view and understand their search engine visibilities, see how such visibilities progress (e.g., improve) over time, and compare these visibilities to other visibilities, such as based on activities the website is currently doing versus did in the past, and benchmark visibilities progress relative to competitors. As a result, a user associated with the target website can dynamically update aspects of the website, such as keyword selection/identification, to improve overall website performance. Similarly, SEV scores described herein can provide relevant users with enhanced capabilities to understand and appropriately assess their SEO campaigns since the SEV scores can be determined by combining various data about keywords of the target website (e.g., search volume, ranking/position, CTR) and applying a gamification metric to the combined data. The gamification metric can advantageously make the SEV scores easier to understand and digest by the relevant user(s), especially to provide benchmarking against competitors and/or to visualize measurable growth of the website.

Moreover, the disclosed technology can be built upon a precise data model for data collection and analysis. Such a data model can advantageously ensure improved accuracy in evaluating organic search visibility. The data model can also provide for dynamically-updated SEV scores and comparisons to competitor and/or the target website itself. Similarly, the disclosed technology can provide for the SEV scores to scale with actual traffic, which means that a higher SEV score for a website can indicate higher expected traffic. As a result, relevant users of the website can easily measure website growth, improvement, popularity, etc.

The details of one or more implementations are set forth in the accompanying drawings and the description below. Other features and advantages will be apparent from the description and drawings, and from the claims.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to systems, methods, and technology for evaluating SEV of a target website based on a keyword and/or a set of keywords.

Figure 1A:
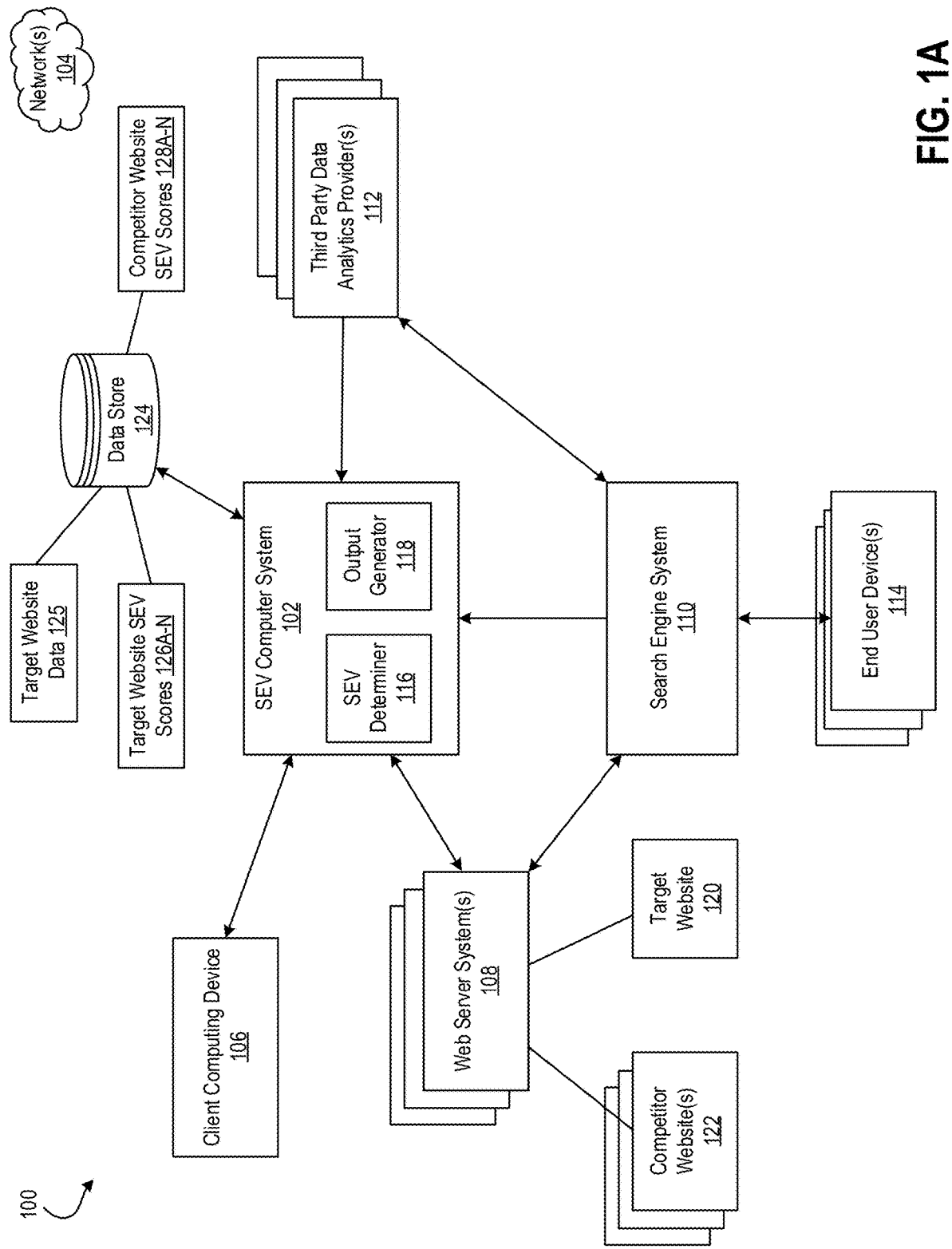
FIGS. 1A and 1B are conceptual diagrams of a system for determining search engine visibility (SEV) metrics for a target website.
Figure 1B:
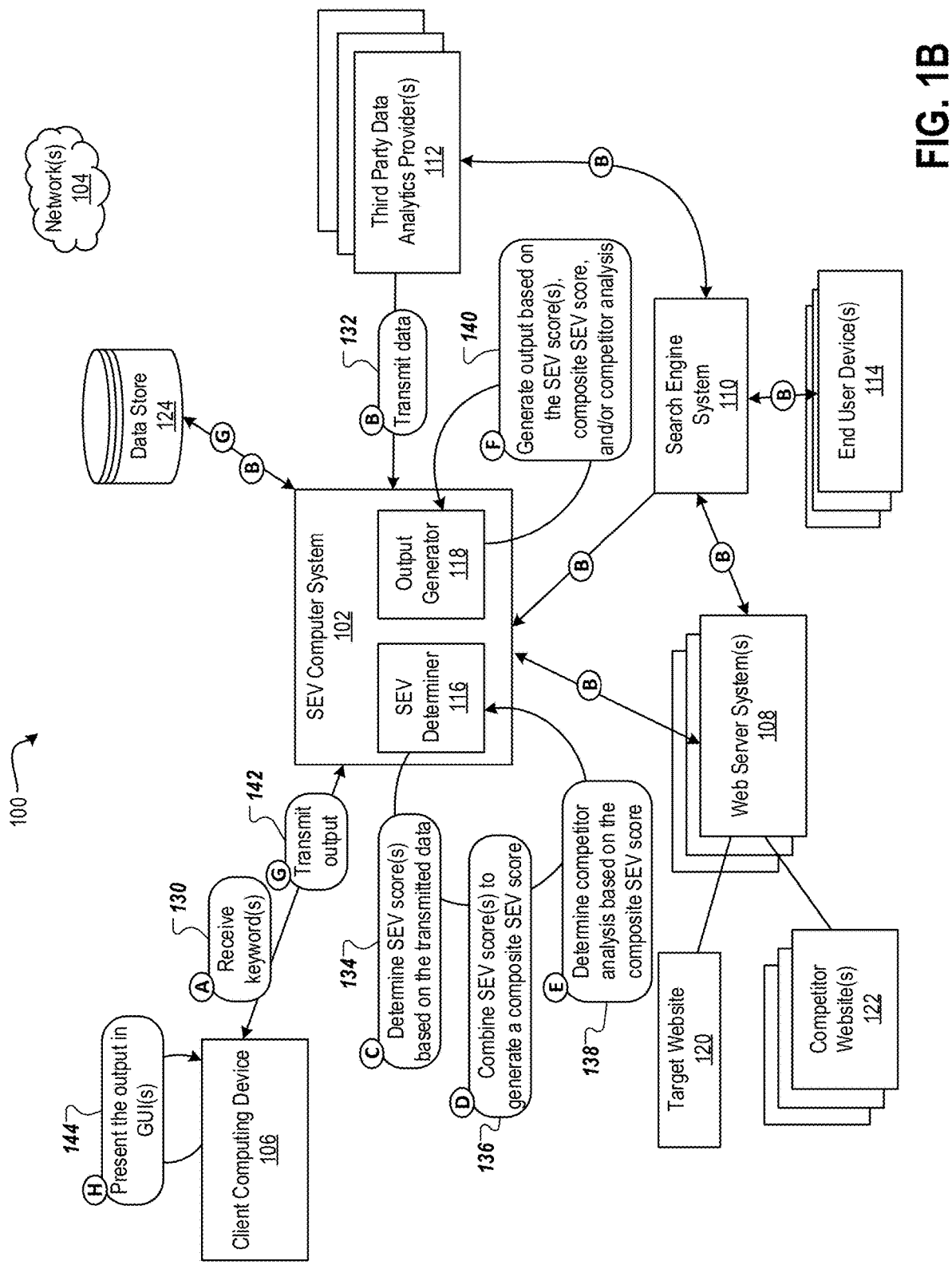

Referring to the figures, FIGS. 1A and 1B are conceptual diagrams of a system 100 for determining search engine visibility (SEV) metrics for a target website 120. As shown in both the FIGS. 1A and 1B, the system 100 can include an SEV computer system 102, a client computing device 106, web server system(s) 108, a search engine system 110, third party data analytics providers 112, end user devices 114, and a data store 124 communicating (e.g., wired, wireless) via network(s) 104.

In brief, the SEV computer system 102 can be any type of computing system configured to perform the techniques described herein, such as generating SEV scores for the target website 120 and one or more competitor websites 122 and generating comparisons between the SEV scores for the target website 120 and the competitor website(s) 122. The SEV computer system 102 can include an SEV determiner 116 and an output generator 118.

The SEV determiner 116 can, for example, be configured to determine the SEV scores as described herein. For example, the SEV determiner 116 can determine an SEV score for each keyword of the target website 120, then combine those SEV scores to determine a combined SEV score for a group of keywords, a particular webpage of the website 120, the website 120 as a whole, and/or one or more activity plans for the website 120. The SEV determiner 116 can also be configured to determine one or more SEV scores for relevant competitor website(s) 122 (the competitors being identified by a user associated with the website 120, such as when the user generates an activity plan, and/or the competitors being automatically identified by the SEV computer system 102 based on analysis of the target website 120 elements/components). The SEV determiner 116 can execute one or more algorithms to determine SEV scores, combine the SEV scores, evaluate the SEV scores, and/or compare the SEV scores over one or more past time periods and/or a current time period. The SEV determiner 116 can also be configured to supplement and/or re-compute historic SEV scores to help relevant users understand whether the website 120 is being improved upon in a positive direction and/or whether changes in the SEV scores is in fact attributed to increased (or decreased) search volume.

The output generator 118 can be configured to generate one or more GUIs for presenting the SEV scores and other relevant information associated with the scores at the client computing device 106, as described further below. The GUIs can be used to depict how the target website 120 improves (or may worsen) over time.

The client computing device 106 can be any type of computing device and/or computing system configured to provide/present, in a display, one or more of the GUIs described herein. The client computing device 106 can be used by a user associated with the target website 120, such as a website developer and/or website owner. Sometimes, the user associated with the target website may be a customer of services provided by the SEV computer system 102. At the client computing device 106, the relevant user can view information about the target website 120, such as how the website is performing relative to its own historical analysis and/or relative to the competitor website(s) 122, all of which may be provided in GUIs from the SEV computer system 102. The relevant user can also use the client computing device 106 to make updates, fixes, modifications, and/or other various changes to the target website 120 (e.g., modifications based on accessibility, broken links, spelling errors, SEO) using the services provided by the SEV computer system 102 via the GUIs.

The web server system(s) 108 can be configured to can host code for webpages of websites, such as the target website 120, the competitor website(s) 122, and any other websites that may be accessed, such as by the end user device(s) 114. The code can be retrieved by any of the systems described herein to render a webpage at the client device 112.

The search engine system 110 can be any type of search engine that can provide search functionality over the web/internet for devices such as the client computing device 106 and/or the end user devices 114. For example, the end user devices 114 (which can include any type of computing device, computer system, mobile device, etc.) can receive input from associated users to search for a particular webpage. The end user devices 114 can transmit that input to the search engine system 110, which can identify the particular webpage (or similar/associated webpages) being searched for and retrieve code for that webpage from the web server system(s) 108. The code can be transmitted back to the end user devices 114 and executed in their respective browsers to present the particular webpage in one or more GUIs. The search engine system 110 can, in some implementations, generate and/or maintain information about search terms and other search inputs that are being provided by the end user devices 114. The search terms and/or search inputs can be used, such as by the third party data analytics providers 112 to determine search volume and/or position/ranking information for particular webpages, websites, search terms, and/or keywords associated with any of the aforementioned.

The third party data analytics providers 112 can be configured to identify, determine, and/or retrieve search ranking, position/ranking, and/or other relevant information about keywords, webpages, and/or websites (e.g., such as for the target website 120 and/or for relevant competitor website(s) 122 of the target website 120). The provider(s) 112 can utilize one or more APIs and provide parameters for keywords, such as geography and timeframe parameters, to the search engine system 110 to obtain the relevant information. Sometimes, the SEV computer system 102 can poll multiple providers 112 for the relevant information and combine (e.g., aggregate) the relevant information received from the providers 112. Sometimes, the SEV computer system 102 may poll a particular provider 112 for some of the relevant information (e.g., search volume data) and poll another provider 112 for other of the relevant information (e.g., position or ranking data). As another example, the SEV computer system 102 can poll a first provider 112 for the relevant information for a European website but can poll a second, different provider 112 for the relevant information for a United States version of the same website. The SEV computer system 102 can consistently poll the same provider(s) 112 over time to ensure consistency in data (e.g., consistency in data collection and processing techniques performed by the provider(s) 112 over time)

As an illustrative example, the client computing device 106 can provide a keyword for which to determine SEV to the SEV computer system 102. The SEV computer system 102 can poll the third party data analytics provider 112 for data about the user-provided keyword, such as search volume data and ranking data. The third party data analytics provider 112 can determine and/or identify the search volume data and/or the ranking data for the user-provided keyword based on polling the search engine system 110 for information about search functionality performed by the end user devices 114 relative to the user-provided keyword. Information received from the search engine system 110 can be further processed by the provider 112 before the provider 112 transmits the information to the SEV computer system 102. The SEV computer system 102 can then use the information provided by the provider 112 to determine the SEV score(s) for the user-provided keyword.

The data store 124 can be any type of database and/or data repository configured to store relevant information about processes performed by the SEV computer system 102, the target website 120, and/or the competitor website(s) 122. For example, as described further herein, the data store 124 can store information such as target website data 125, target website SEV scores 126A-N, and/or competitor website SEV scores 128A-N. Any of the data 125, 126A-N, and/or 128A-N can be determined for and associated with a particular time period (e.g., a past month, a past 6 months, a past year, a current day, a current week). Any of the data 125, 126A-N, and/or 128A-N can be stored in association with a particular keyword, a set or grouping of keywords, and/or an activity plan. Moreover, the data 125 can include information such as keywords used across the target website 120, sets and/or groups of keywords for the target website 120, and/or activity plans associated with the target website 120. One or more other relevant information about the target website 120 and/or users associated with the website 120 (e.g., customer preferences for checking, scoring, and/or updating/fixing various aspects of the website 120) can be stored as part of the target website data 125.

As shown in FIG. 1B, the SEV computer system 102 can receive one or more keywords for the target website 120 from the client computing device 106 (block A, 130). The device 106 can therefore indicate a keyword or a set of keywords for which to determine an SEV score or combined SEV score. One or more other information can also be received in block A (130), as described further in reference to FIGS. 2A, 2B, 2C, and 2D.

The SEV computer system 102 can communicate with the web server system(s) 108, the search engine system 110, the data store 124, and/or the third party data analytics providers 112 to receive data that can be used by the SEV determiner 116 to determine the SEV score(s) (block B, 132). For example, the SEV computer system 102 can receive code and/or other relevant information for the target website 120 from the web server system(s) 108. The SEV computer system 102 can receive search engine results and/or other SEO-related data from the search engine system 110. As described above, the search engine system 110 may also transmit data (block B, 132) between the web server system(s) 108 and the end user devices 114 to provide code for presenting the target website 120, the competitor website(s) 122, and/or other searched-for websites in GUI displays at the end user devices 114. Any of the transmitted data and/or interactions between the end user devices 114 and website/webpage results provided by the search engine system 110 can be transmitted to the SEV computer system 102 (block B, 132). The SEV computer system 102 can also communicate with the data store 124 to receive information such as SEV scores determined for the target website 120 and/or the competitor website(s) 122 over one or more past time periods and/or a current time period. The SEV computer system 102 can also receive information from the data store 124 about the particular website 120, such as information about keywords, sets of keywords, and/or activity plans that have been defined for the target website 120.

As another example, the SEV computer system 102 can communicate with the providers 112 to obtain relevant inputs for determining the SEV score(s), including but not limited to search volume data, position/ranking data, and/or CTR data for the target website 120 and/or the competitor website(s) 122 (block B, 132). In turn, the providers 112 can communicate with and transmit data with the search engine system 110 to obtain relevant information for determining and/or providing the search volume data, the position/ranking data, and/or the CTR data to the SEV computer system 102 (block B, 132). For example, the search engine system 110 may generate and/or publish search volume data about keywords that are trending on the search engine. The providers 112 can then communicate with the system 110 to obtain that search volume data. The search engine system 110 may also generate the rankings data for particular search queries that are performed by the end user devices 114 using the search engine. The providers 112 can poll the system 110 for this generated rankings data for a particular keyword(s) and/or search query.

The SEV determiner 116 can determine the SEV score(s) for the target website 120 (and sometimes the competitor website(s) 122 as well) based on the transmitted data (block C, 134). Determining the SEV score(s) can be part of a two-step process that includes (i) estimating traffic and (ii) gamifying a relationship between search volume and position data.

The SEV determiner 116 can also combine one or more of the SEV score(s) for the target website 120 and/or the competitor website(s) 122 to generate a respective composite SEV score (block D, 136). The composite score can be determined for a particular set of keywords, a webpage of the website 120, and/or an activity plan associated with the website 120.

Refer to at least FIGS. 2A, 2B, 2C, and 2D for further discussion about determining and combining the SEV score(s).

The SEV determiner 116 may determine a competitor analysis for the target website 120 based on at least the composite SEV score for the target website 120 and the competitor website(s) 122 (block E, 138). The competitor analysis can be determined for the current time period and/or for one or more past time periods (such timeframes being determined and/or identified by the client computing device 106 and/or automatically by the SEV computer system 102). The SEV determiner 116 can also be configured to determine a historical analysis for the target website 120 in block E (138). Sometimes, the historical analysis may include re-computing one or more of the SEV scores for the target website 120 (and/or the competitor website(s) 122). Refer to at least FIGS. 2C, 2D, and 3 for further discussion.

The output generator 118 can generate output (e.g., GUIs) based on the SEV score(s), the composite SEV score(s), and/or the competitor (and/or historical) analysis in block F, 140. The output can include one or more GUIs described in reference to FIGS. 4A, 4B, 5A, 5B, and 6.

The output can be transmitted from the SEV computer system 102 to the client computing device 106 (block G, 142). The client computing device 106 can present the output in GUIs described herein (block H, 144). In some implementations, the SEV computer system 102 can also transmit the output to the data store 124 for storage and later retrieval/processing.

As an illustrative example of the techniques described in reference to FIGS. 1A and 1B, the client computing device 106 can provide a list of keywords and associated activity plans for the target website 120 to the SEV computer system 102. The SEV computer system 102 can determine an SEV score for each of the keywords (which sometimes can be used to rank the keywords amongst each other for the associated activity plan(s)) and a combined SEV score for the list of keywords and/or for the associated activity plan(s). Algorithms used by the SEV computer system 102 (refer to FIGS. 2A and 2B) can ensure that outlier keywords (e.g., keywords that may not be part of the list or otherwise part of a same category as keywords in the list) may not largely impact the SEV score(s), especially if those outlier keywords have smaller search volumes and/or worse rankings than the keywords in the user-provided list. The SEV computer system 102 may perform an additional process to identify the competitor website(s) 122 for the target website 120, determine SEV scores for the competitor website(s) 122, and generate output showing a comparison of the SEV scores for the target website 120 and the competitor website(s) 122.

Figure 2A:
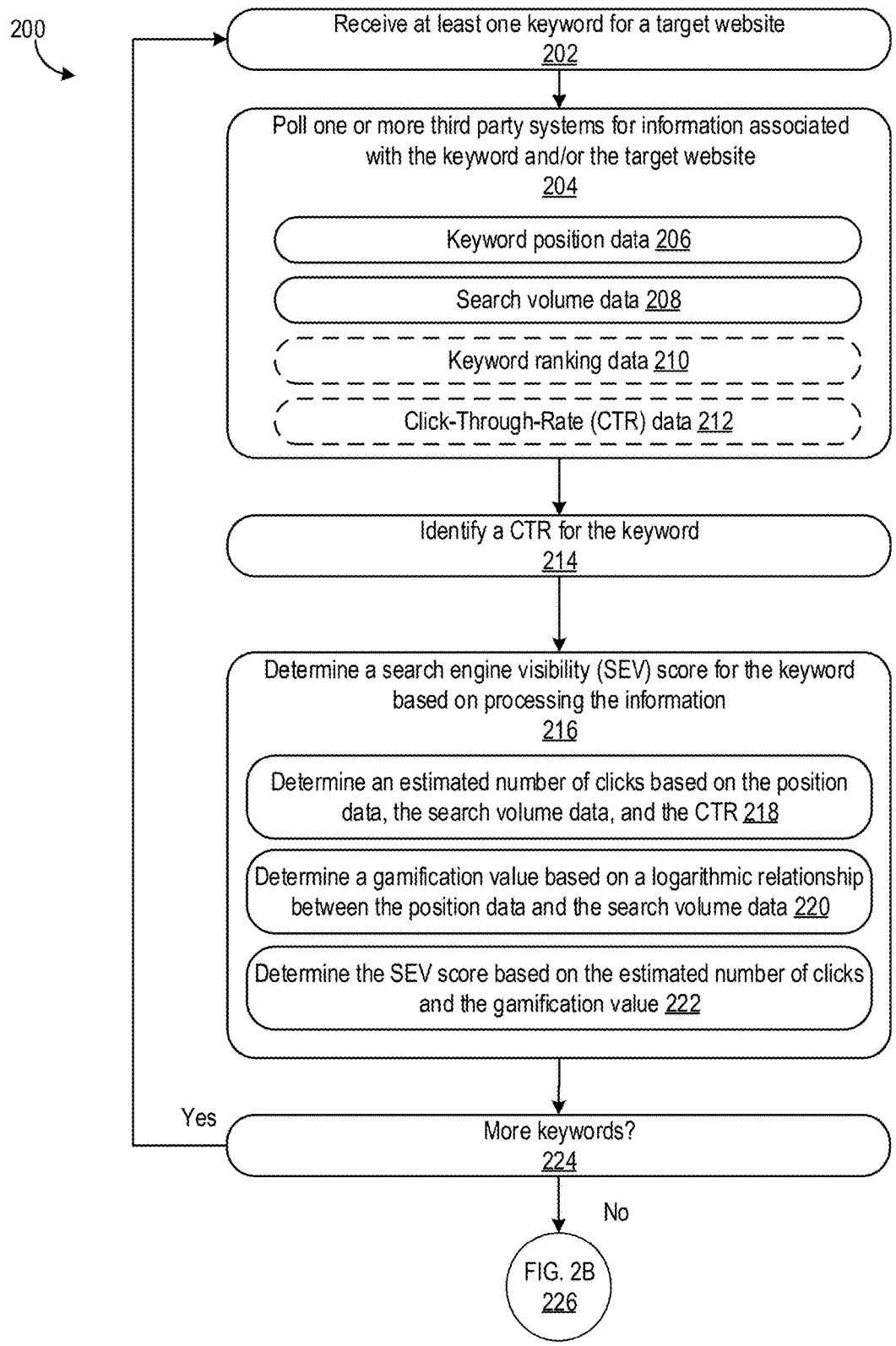
FIGS. 2A and 2B is a flowchart of a process for determining SEV metrics for a target website using the disclosed techniques.
Figure 2B:
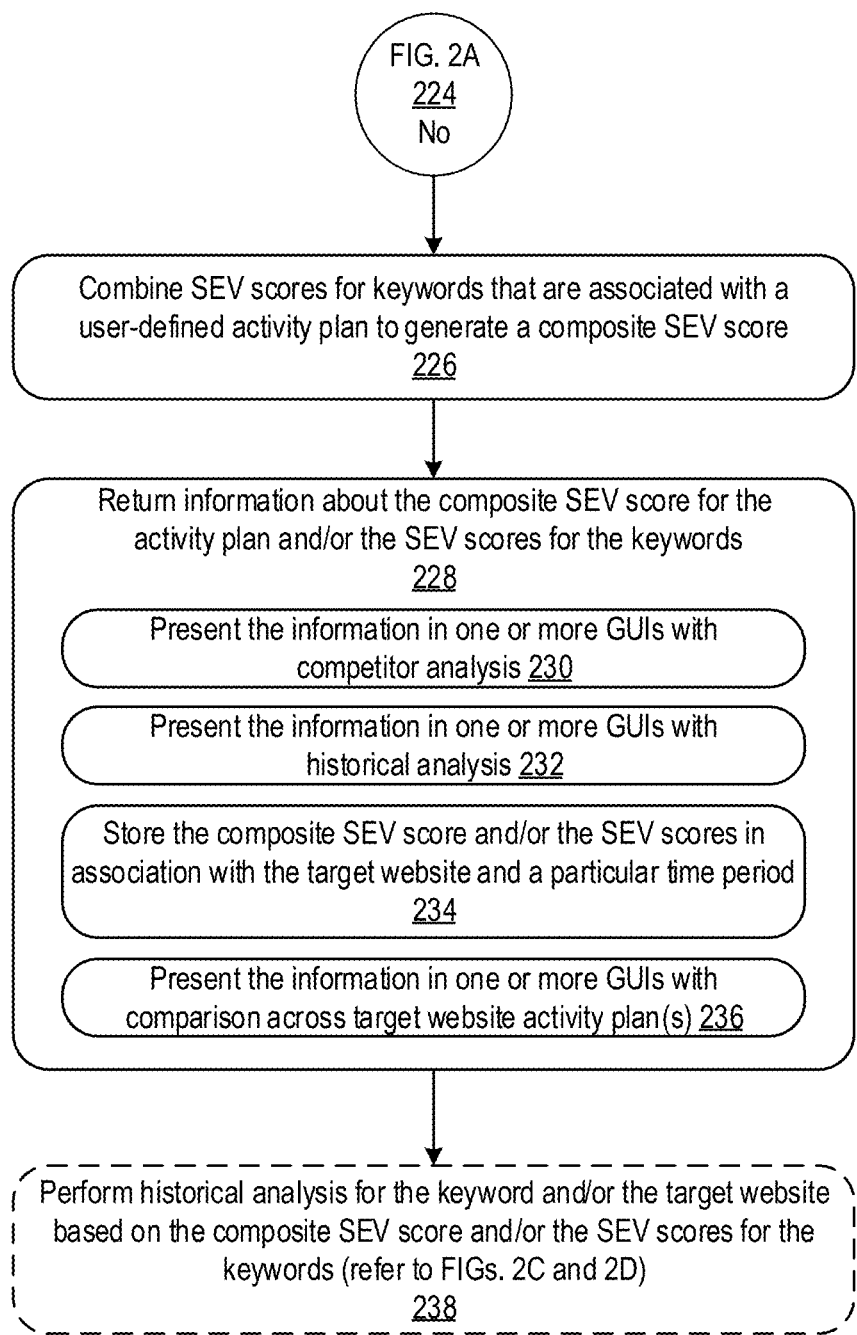

FIGS. 2A and 2B is a flowchart of a process 200 for determining SEV metrics for a target website using the disclosed techniques. The process 200 can be performed by the SEV computer system 102. The process 200 can also be performed by one or more other computing systems, devices, computers, networks, cloud-based systems, and/or cloud-based services. For illustrative purposes, the process 200 is described from the perspective of a computer system.

The process 200 can be performed at predetermined time intervals, such as once a week, every day, every other day, once a month, quarterly, etc. For example, SEV scores can be determined and/or updated/re-computed once a week. The reason the SEV scores can be determined and/or updated less frequently is because SEV may be fairly static for extended periods of time. Special circumstances, such as trending topics or seasonal keywords (e.g., ice cream during the summer, skiing during the winter), may cause rapid changes in the SEV and thus may be reason to determine the SEV scores more frequently.

Referring to the process 200 in FIGS. 2A and 2B, the computer system can receive at least one keyword for a target website in block 202. A user associated with the target website can provide the keyword(s) as input in one or more GUIs provided by the computer system. The user can indicate the keyword(s) of interest for benchmarking performance of the keyword(s), an associated activity plan, an associated webpage, and/or the target website as a whole. Sometimes, the computer system can automatically retrieve the keyword(s) in block 202, such as from a data store that may maintain keywords of interest to the user or otherwise associated with the target website.

In block 204, the computer system can poll one or more third party systems for information associated with the keyword and/or the target website. Refer to FIGS. 1A and 1B for further discussion about the polling. The third party systems can be the same as or similar to the third party data analytics providers 112 described in reference to FIGS. 1A and 1B. As examples of block 204, the computer system can poll the third party systems for keyword position data (block 206) and/or search volume data (block 208). The position data can indicate placement of the keyword in a search engine. As an illustrative example, a website 'SEOoptimization.com' can be ranked number two, and on a keyword 'SEO,' the position can be two. The search volume data can indicate how many searches may happen every predetermined period of time (e.g., every day, every week, every month) for the keyword. Sometimes, the search volume can be an aggregated traffic for the keyword.

Optionally, the computer system can poll the third party systems for keyword ranking data (block 210) and/or CTR data (block 212). The keyword ranking data can be the same as the keyword position data in some implementations. The CTR data can indicate a ratio of end users who see a search result and click on that result. As an illustrative example, a 20% CTR rate can indicate that if 1,000 end users see the target website's search result, then 200 of those end users ended up clicking on that search result.

The position/ranking, search volume, and/or CTR described in blocks 206-212 can be associated with the particular keyword. In some implementations, the third party systems can provide raw data to the computer system, and the computer system can process the raw data with one or more mappings to determine the position, ranking, search volume, and/or CTR data.

The computer system can identify a CTR for the keyword in block 214. Sometimes, if the computer system receives the CTR data in block 212, then the computer system can identify the CTR for the keyword as the received CTR data (or based on the received CTR data). Sometimes, the computer system may identify a static value as the CTR for the keyword. If the computer system does not receive the CTR data in block 212, then the computer system can determine the CTR for the keyword based on other information that is received, such as the keyword position data (block 206) and the search volume data (block 208). For example, the computer system can identify the keyword position and, based on averages, assign the CTR based on the position (e.g., benchmark the CTR). The CTR can be used as part of weighting one or more values used to determine the SEV score.

In block 216, the computer system can determine an SEV score for the keyword based on processing the received information from the third party systems. As described herein, the SEV score can be determined in a two-step process. The score may not be directly derived from either the search volume or the position. A gamification metric can be applied to the search volume and the position in order to determine the SEV score. As a result, the search volume can be evened out so that that SEV score is not dominated solely by high-ranking keywords. As shown by blocks 218-222, determining the SEV score can be based on a logarithmic relationship (instead of a linear induction) and a score range can be unbounded (e.g., the score can be a value from 0 to 5,000+). In some implementations, if the search volume is 0 (meaning there is no traffic associated with the keyword), then the process can stop for determining the SEV score for the keyword (in other words, the SEV score for the keyword may be 0).

First, the computer system can determine an estimated number of clicks based on the position data, the search volume data, and the CTR (block 218). The estimated number of clicks can be determined based on the keyword position using a weight (e.g., the CTR) applied thereto and the search volume. The estimated number of clicks can be determined for a predetermined period of time, such as a past time period (e.g., a past week, past month, past 3 months, past 6 months) and/or a current time period (a current day, a current week, a current month). As an illustrative example, an algorithm can perform the following step for block 218: var estimate=CTR.FromPosition (position) *search Volume.

Second, the computer system can determine a gamification value based on a logarithmic relationship between the position data and the search volume data (block 220). The gamification value can highlight the full estimated number of clicks or penalize that estimated number of clicks. The penalty can sometimes be small if the keyword is high ranking and has a high search volume. The gamification value can be an absolute value (e.g., non-negative). The gamification value can have a term that scales with keyword position (e.g., ranking) as (1-position/100). As a result, all positions less than 100 can contribute positively to the gamification value. In some implementations, the top 100 positions can be changed, such as based on a particular website. Instead of top 100 positions, the computer system can use one or more other values, including but not limited to top 10 positions, top 25 positions, top 50 positions, top 75 positions, top 110 positions, etc. The logarithmic relationship can advantageously be used to highlight whether the keyword SEV is improving in a satisfying way. Moreover, the logarithmic relationship can advantageously ensure that top ranking keywords are not being overshadowed by lower ranking keywords. As an illustrative example, the algorithm can perform the following step for block 220: var gamification=Math.Log10 (search Volume)*(1-position/100).

Then, the computer system can determine the SEV score based on the estimated number of clicks and the gamification value (block 222). Determining the SEV score can be based on summating or aggregating the estimated number of clicks and the gamification value. As a result, the SEV score may not be a bounded value, which can allow for greater visibility and ease of understanding of the keyword's SEV for the relevant users. As an illustrative example, the algorithm can perform the following step for block 222: return SEVscore=estimate+gamification.

In some implementations, the computer system can perform slightly different steps in blocks 218-222 based on whether the keyword is high ranking (e.g., top 10 keyword) or low ranking (e.g., not in the top 10). For example, for a high ranking keyword, the estimated traffic (block 218) can be based on multiplying together the CTR and search volume for the keyword. As a result, a majority of the resulting SEV score may reflect the total amount of traffic associated with the keyword. For a low ranking keyword, various steps can be performed to generate a metric that may gamify improving keyword rankings, even for keywords that may be ranking relatively low. A resulting value for the SEV score may not overshadow the high ranking keywords but at the same time allow for slight changes when overall positions improve for the low ranking keywords. In other words, the disclosed techniques can be performed to ensure that a keyword with a 100 million search volume but a ranking of 80+ does not have a significantly larger impact on an overall SEV score for the target website than another keyword having a smaller search volume but a better/higher ranking (e.g., top 10).

The computer system can determine whether there are more keywords for which to determine respective SEV scores (block 224). If there are more keywords, the computer system can return to block 202 and iterate through the blocks 202-222 until there are no more keywords. If there are no more keywords, the computer system proceeds to block 226.

Figure 5A:
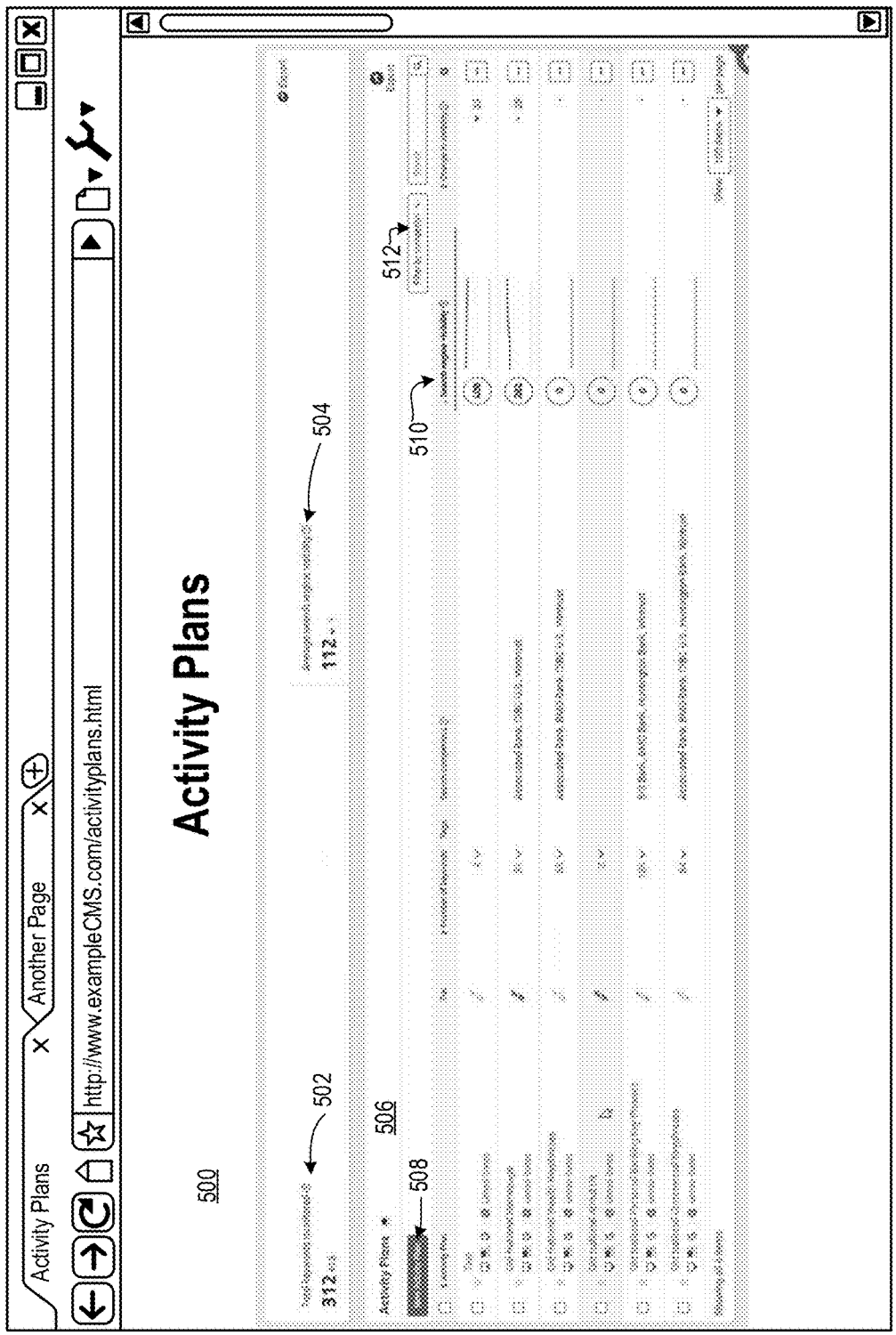
FIG. 5A illustrates a GUI for presenting information about activity plans for a target website.
Figure 5B:
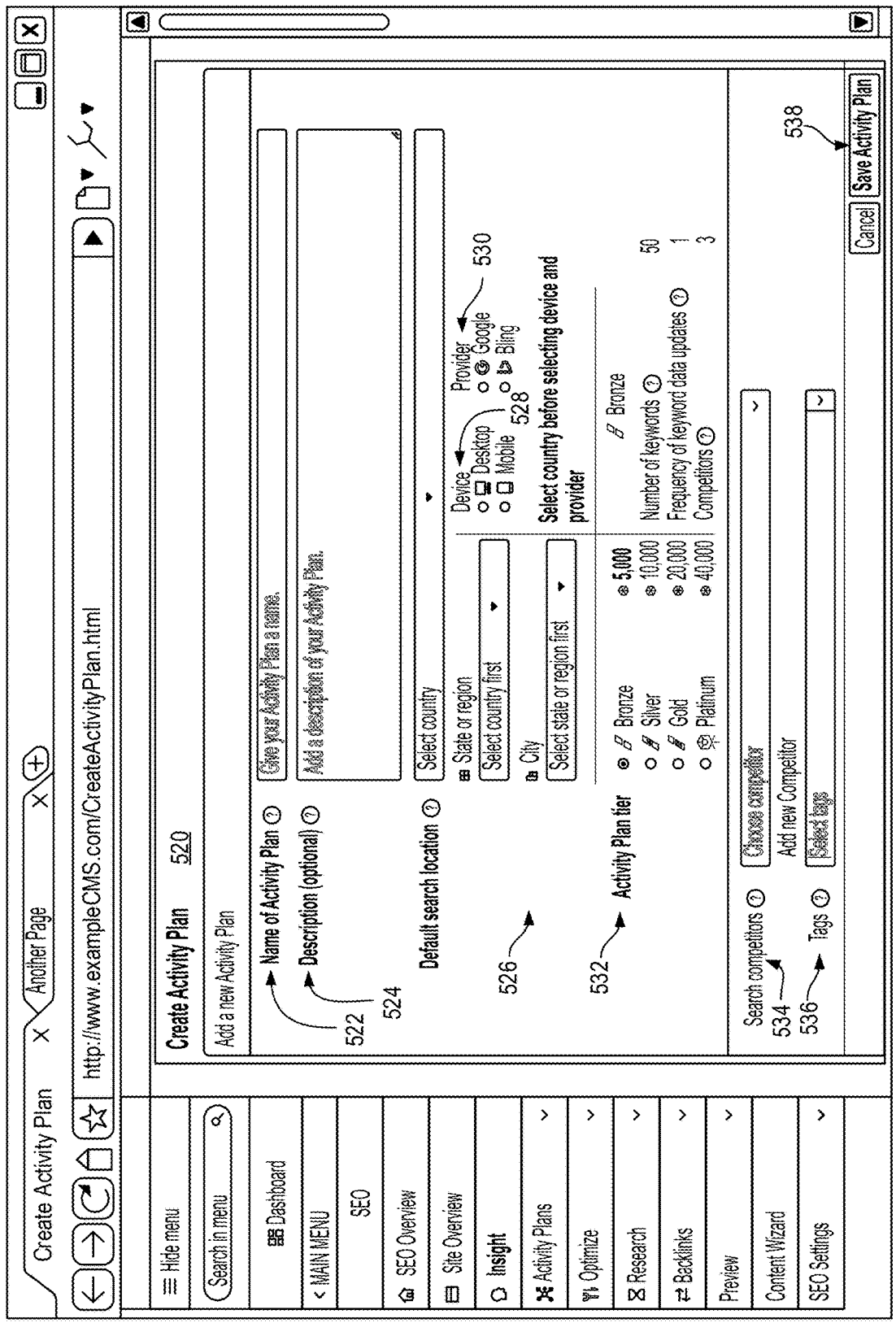
FIG. 5B illustrates a GUI for creating an activity plan for a target website.

In block 226, the computer system can combine the SEV scores for the keywords that are associated with a user-defined activity plan to generate a composite SEV score. The SEV scores can be combined by adding or summating them into the composite SEV score. As described above, the composite SEV score may be unbounded. The activity plan, as described herein, can be a workflow for measuring progress and/or tasks to be performed with respect to the target website. Refer to FIGS. 5A and 5B for further discussion about the activity plan. The computer system can generate the composite SEV score for the activity plan.

The computer system can then return information about the composite SEV score for the activity plan and/or the SEV scores for the keywords (block 228). For example, the computer system can present the information in one or more GUIs with competitor analysis information (block 230). As another example, the computer system can present the information in one or more GUIs with historical analysis information (block 232). The computer system can store the composite score and/or the SEV scores in association with the target website and a particular time period (block 234). The computer system can additionally or alternatively present information in one or more GUIs with comparison across one or more activity plans of the target website (block 236). Refer to FIGS. 4A, 4B, 5A, 5B, and 6 for further discussion about the GUIs.

Presenting a comparison of SEV scores across activity plans for the target website (block 236) can help relevant users determine which activity plan is performing better from a search engine perspective. The relevant users can select which activity plans to compare. Sometimes, the computer system can automatically select which activity plans to compare and present in the GUIs. In an illustrative example, a first activity plan having 1,000 keywords can have a higher SEV score than a second activity plan having 10 keywords since more SEV scores are being aggregated for the first activity plan. A comparison of composite SEV scores for the first and second activity plans can help the relevant users visualize and understand which activity plan may require additional attention and/or whether new or other keywords should be added to either activity plan.

The process 200 can stop after performing blocks 228-236.

Figure 2C:
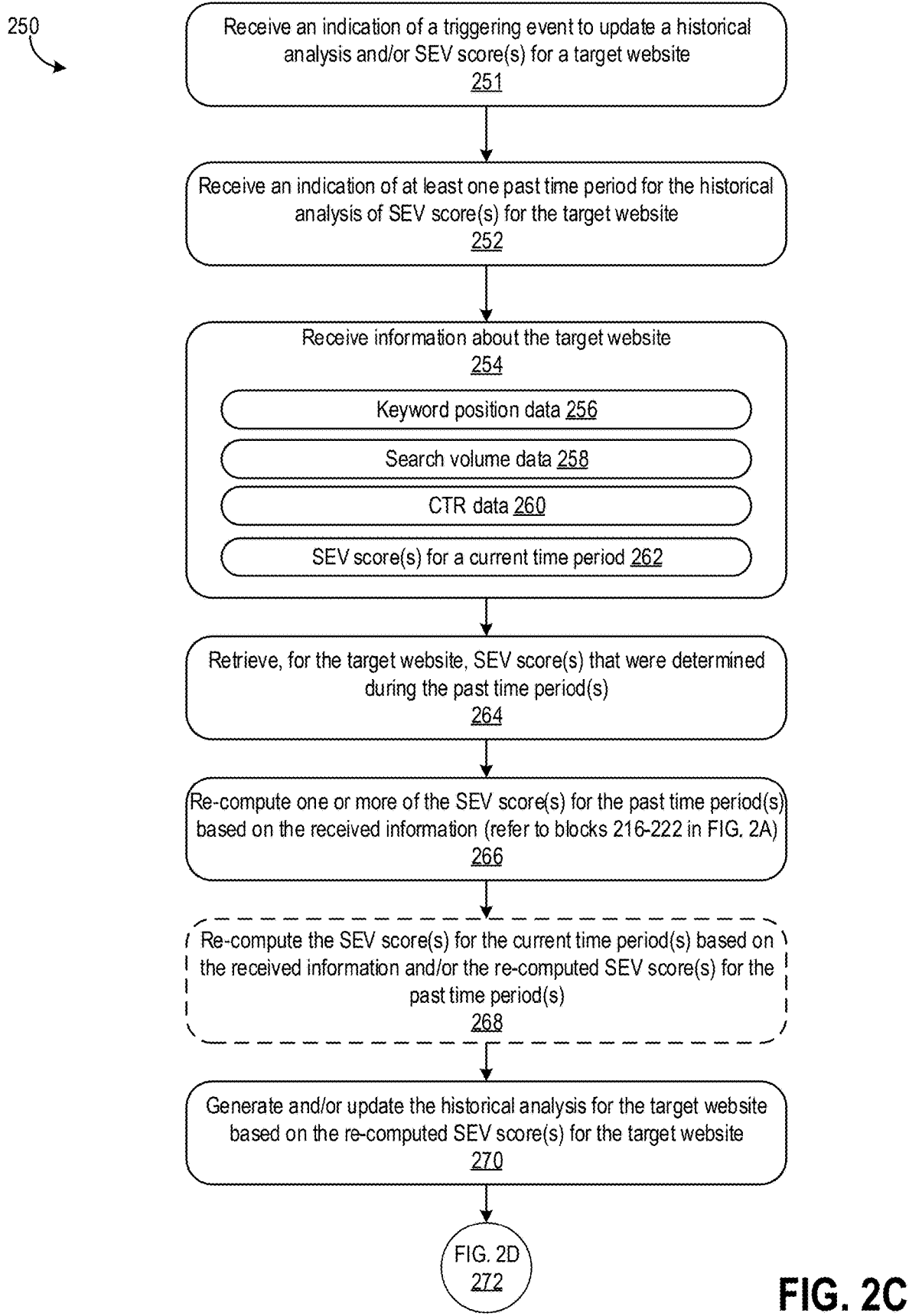
FIGS. 2C and 2D is a flowchart of a process for re-computing SEV scores and updating historical analyses for a target website.
Figure 2D:
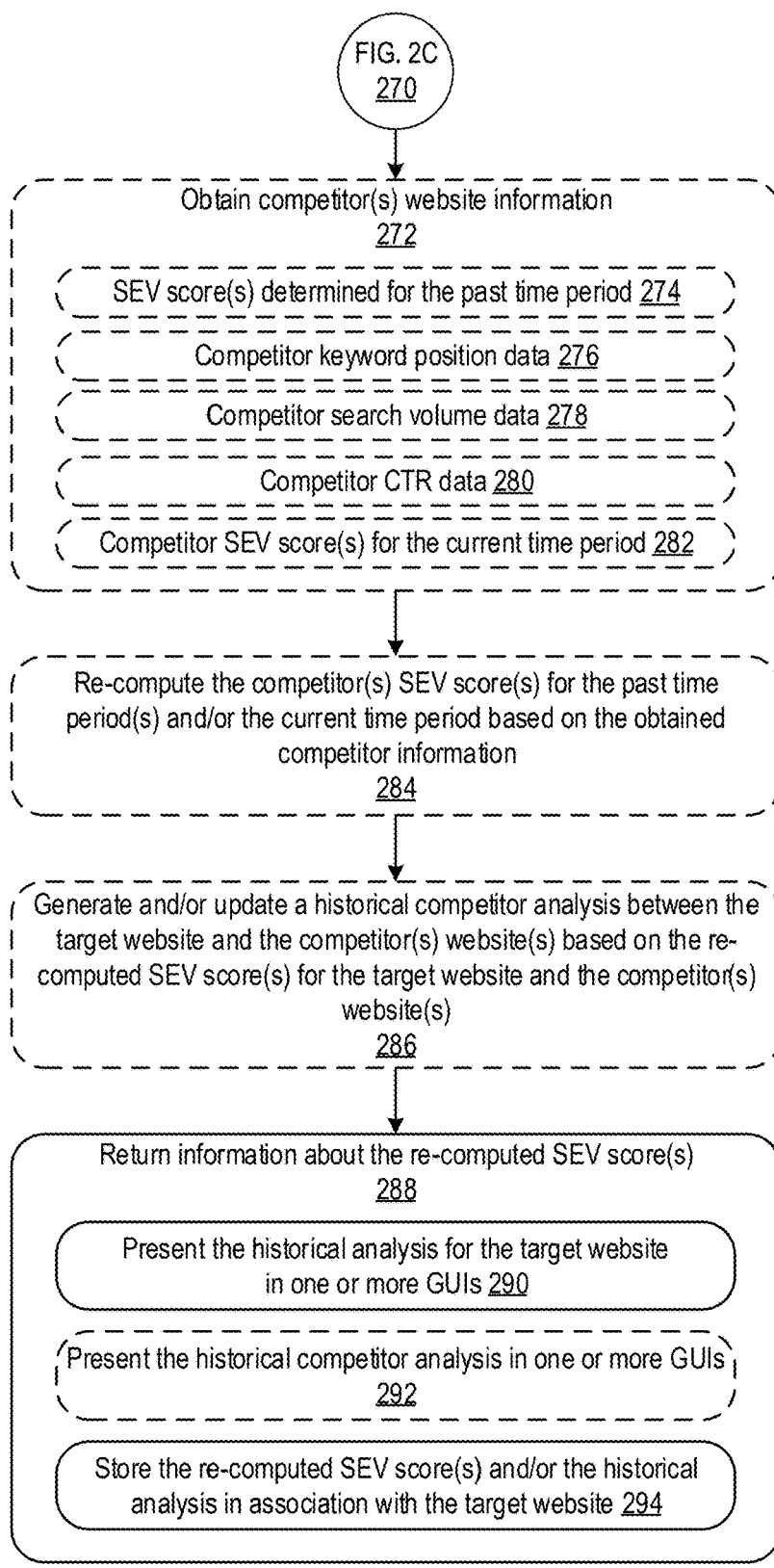

Optionally, the computer system can perform a historical analysis for the keyword and/or the target website based on the composite SEV score and/or the SEV scores for the keywords (block 238). Refer to FIGS. 2C and 2D for further discussion about performing the historical analysis, in which one or more SEV scores may be re-computed.

FIGS. 2C and 2D is a flowchart of a process 250 for re-computing SEV scores and updating historical analyses for a target website. The process 250 can be performed by the SEV computer system 102. The process 250 can also be performed by one or more other computing systems, devices, computers, networks, cloud-based systems, and/or cloud-based services. For illustrative purposes, the process 250 is described from the perspective of a computer system.

The process 250 of backward-looking SEV score updating can be performed at predetermined time intervals (e.g., same or different times that current SEV scores may be computed, as described in the process 200 of FIGS. 2A and 2B). The process 250 can be performed whenever updates are made to an existing activity plan, changes are made to the target website, and/or changes are made to keyword information for the target website. For example, additional keywords can be added to an activity plan after an SEV score has been determined for the activity plan. If 3 new keywords that are added to the activity plan rank in the top 10, the SEV for the activity pan may be suddenly higher than before the 3 new keywords were added. Thus, the process 250 can be performed to work backwards to re-compute or update previously-determined SEV scores in light of the additional keywords to accurately measure growth in SEV for the activity plan. The process 250 can be performed to update historic SEV values and rebuild historical values with those keywords added (or removed in scenarios where the activity plan is updated by removing keywords). The process 250 can be performed to update individual SEV scores, such as individual keyword SEV scores determined in the process 200 of FIGS. 2A and 2B. Additionally or alternatively, the process 250 can be performed to update various differently-combined SEV scores, in addition to or instead of a single combined/aggregate SEV score (e.g., the single combined SEV score for the activity plan). By updating individual SEV scores and/or differently-combined SEV scores, the process 250 can provide a more granular and realistic vantage into how SEV changes over time for the activity plan and/or the target website as a whole.

Referring to the process 250 in FIGS. 2C and 2D, the computer system can receive an indication of a triggering event to update a historical analysis and/or SEV score(s) for a target website (block 251). As mentioned above, the triggering event can be a change to the activity plan, a change to the target website, and/or a change to keyword information for the target website (e.g., adding or removing keywords from a keyword grouping or activity plan). The indication can be received automatically from a computing device of a relevant user that is implementing the change mentioned above. The indication can be received automatically from the computer system itself in identifying that the change mentioned above was/is implemented. In some implementations, the computing device of the relevant user can provide the indication as part of user input indicating that the relevant user desires to re-compute historical SEV scores for the target website.

In block 252, the computer system can receive an indication of at least one past time period for the historical analysis of SEV score(s) for the target website. The past time period(s) can be identified by the relevant user and provided as user input at the user's computing device. Additionally or alternatively, the computer system can automatically determine the past time period(s) using one or more timing criteria and/or conditions. For example, the computer system may re-compute SEV scores for a past month, a past 3 months, a past 6 months, a past year, etc. In some implementations, the past time periods may be overlapping, such as a first time period from a current time to 3 months back, a second time period from 2 months back to 6 months back, a third time period from 4 months back to 8 months back, etc. In some implementations, the past time period(s) can be defined by or otherwise based on competitor time periods.

The computer system can also receive information about the target website in block 254. The information received can be for the current time period and/or the designated past time period(s). For example, the information can include keyword position data (block 256), search volume data (block 258), CTR data (block 260), and/or SEV score(s) for the current time period (block 262). Refer to the process 200 in FIGS. 2A and 2B for further discussion about the information received in blocks 254-262.

In block 264, the computer system can retrieve, for the target website, SEV score(s) that were determined during the past time period(s). The SEV score(s) can be stored in a data store in association with a particular keyword, group of keywords, activity plan, and/or target website. The SEV score(s) can further be stored in the data store in association with a particular time period for which the SEV score(s) was determined. Therefore, retrieving the past SEV score(s) can include retrieving only the SEV score(s) that was determined for the past time period(s) identified in block 252.

In an illustrative example, keyword position and/or search volume may not change for each of keywords A, B, and C, which are associated with an activity plan for the past 6 months. The activity plan can be updated to include a new keyword D. In the process 250, the computer system may not update the SEV scores for the keywords A, B, and C (since information associated with the keywords did not change over the past 6 months or any change was less than some predetermined threshold value). Rather, the computer system can efficiently and simply determine a current SEV score for the new keyword D, retrieve a combined SEV score for the activity plan from the data store that was determined over the past 6 months, and update the combined SEV score for the activity plan to include the SEV score determined for the new keyword D. Sometimes, the computer system may determine/update the current combined SEV score for the activity plan and also update historic combined SEV scores for the activity plan over the past time period(s) (e.g., the past 6 months). Updating the historic combined SEV scores can reflect a realistic and accurate growth in SEV for the activity plan as the new keyword D was introduced to the group of keywords.

The computer system may re-compute one or more of the SEV score(s) for the past time period(s) based on the received information in block 266. Refer to blocks 216-222 in the process 200 of FIGS. 2A and 2B for further discussion.

Optionally, the computer system may re-compute the SEV score(s) for the current time period(s) based on the received information and/or the re-computed SEV score(s) for the past time period(s) (block 268). Also refer to blocks 216-222 in the process 200 of FIGS. 2A and 2B for further discussion.

The computer system can generate and/or update the historical analysis for the target website based on the re-computed SEV score(s) for the target website (block 270). As described herein, the historical analysis can include one or more visuals, such as graphs, illustrating a change in SEV scores over time for the target website (with respect to a particular keyword, a group of keywords, an activity plan, and/or the target website as a whole).

Optionally, the computer system may obtain competitor(s) website information in block 272. For example, if the relevant user has defined (in the past or currently) one or more competitors for their activity plan, the computer system may perform blocks 272-286 to update a historical and/or current competitor analysis in light of changes to keyword information for the target website and/or the competitor(s) website. In some implementations, the computer system may automatically perform blocks 272-286 if the computer system identifies, over the past time period(s) and/or the current time period, one or more competitor websites for benchmarking the target website.

The information received in block 272 can optionally include SEV score(s) determined for the past time period(s) (block 274), competitor keyword position data (block 276), competitor search volume data (block 278), competitor CTR data (block 280), and/or competitor SEV score(s) for the current time period (block 282). The SEV score(s) for the competitor website can be stored in association with the target website and time periods at which those SEV scores were determined. Refer to blocks 254-262 for further discussion.

The computer system can optionally re-compute the competitor(s) SEV score(s) for the past time period(s) and/or the current time period based on the obtained competitor information (block 284). Refer to blocks 266 and 268 for further discussion.

Optionally, the computer system may generate and/or update a historical competitor analysis between the target website and the competitor(s) website(s) based on the re-computed SEV score(s) for the target website and the competitor(s) website (block 286). Refer to block 270 for further discussion.

In block 288, the computer system can return information about the re-computed SEV score(s). For example, the computer system can present the historical analysis for the target website in one or more GUIs (block 290). As another example, the computer system can optionally present the historical competitor analysis in one or more GUIs (block 292). The computer system may also store the re-computed SEV score(s) and/or the historical analysis in association with the target website (block 294).

Figure 3:
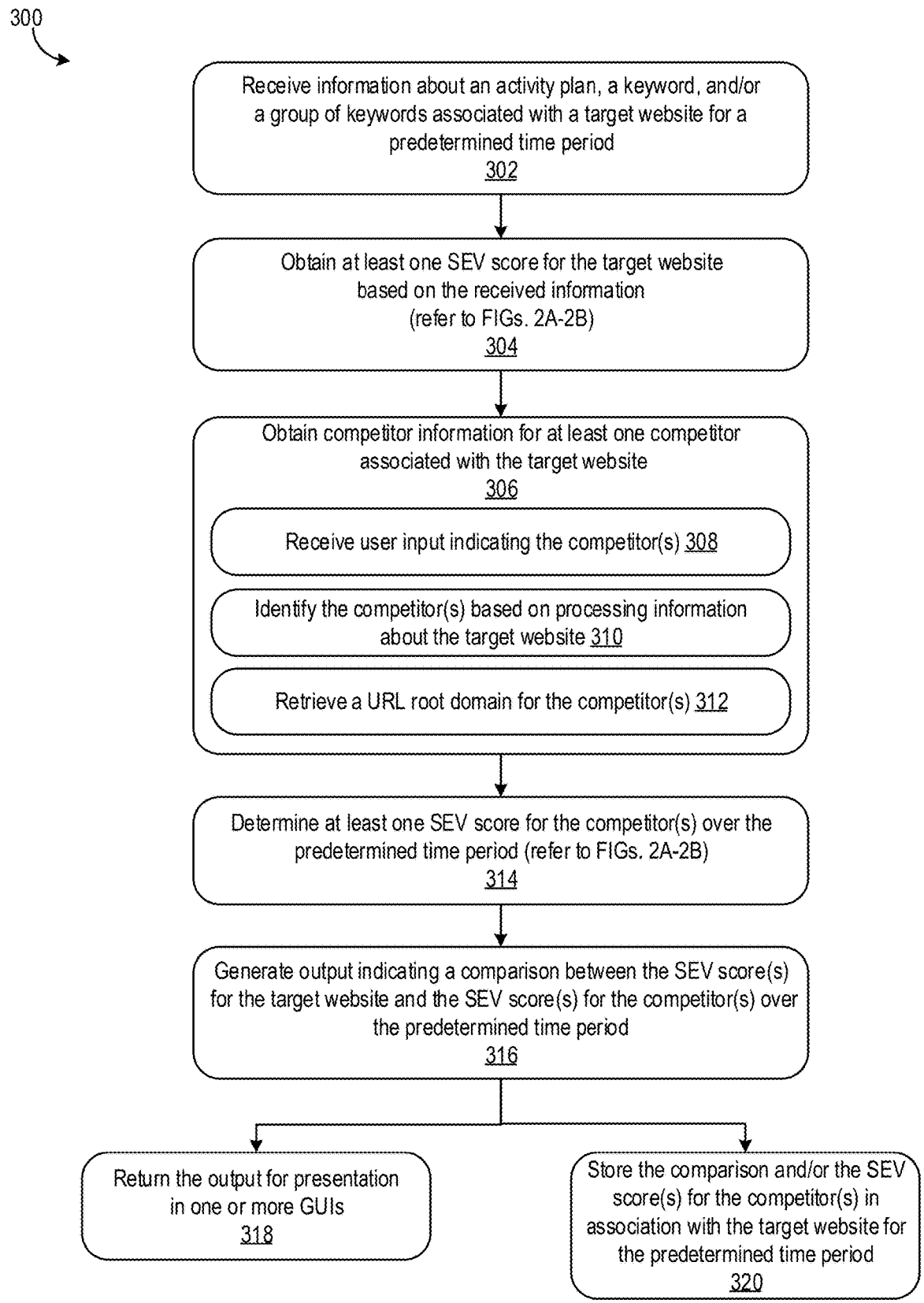
FIG. 3 is a flowchart of a process for performing a competitor analysis for a target website based on SEV metrics.

FIG. 3 is a flowchart of a process 300 for performing a competitor analysis for a target website based on SEV metrics. The competitor analysis can be performed/generated based on SEV scores determined for a current time period and/or one or more past time periods. Additionally or alternatively, the competitor analysis can be performed/generated based on SEV and/or search volume data. The competitor analysis can be performed/generated to compare and/or benchmark the target website based on activity plan, keyword grouping(s), and/or individual keywords.

The process 300 can be performed by the SEV computer system 102. The process 300 can also be performed by one or more other computing systems, devices, computers, networks, cloud-based systems, and/or cloud-based services. For illustrative purposes, the process 300 is described from the perspective of a computer system.

Referring to the process 300 in FIG. 3, the computer system can receive information about an activity plan, a keyword, and/or a group of keywords associated with a target website for a predetermined time period (block 302). The timer period can be a current time period and/or one or more past time periods. Refer to at least blocks 254-262 in the process 250 of FIGS. 2C and 2D.

The computer system can obtain at least one SEV score for the target website based on the received information in block 304. Refer to the process 200 in FIGS. 2A and 2B for further discussion about generating the SEV score(s). Refer to the process 250 in FIGS. 2C and 2D for further discussion about retrieving previously-determined SEV score(s) from a data store.

In block 306, the computer system can obtain competitor information for at least one competitor associated with the target website. For example, the computer system can receive user input indicating the competitor(s) (block 308). The computer system can identify the competitor(s) based on processing information about the target website (block 310). Obtaining the competitor information can include retrieving a URL root domain for the competitor(s) (block 312). The URL root domain can be used by the computer system as an identifier of the competitor(s) and to poll third party systems and other computing systems for information associated with the competitor(s), which can then be used to generate the competitor analysis.

The computer system can determine at least one SEV score for the competitor(s) over the predetermined time period in block 314. Refer to the process 200 in FIGS. 2A and 2B for further discussion about determining the SEV score(s).

Figure 4A:
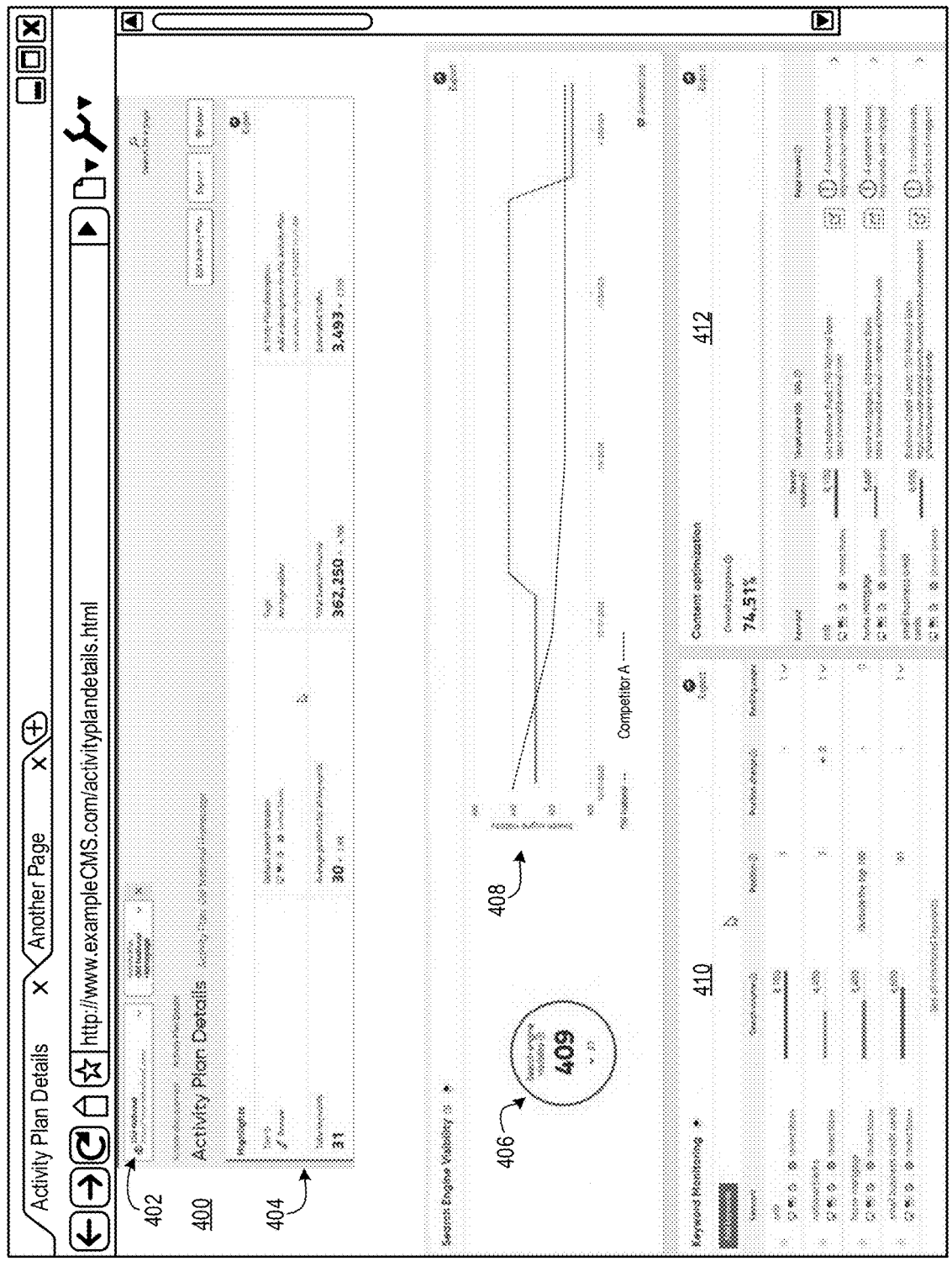
FIGS. 4A and 4B illustrates a graphical user interface (GUI) for presenting information about an activity plan for a target website, including SEV metrics.

The computer system can generate output indicating a comparison between the SEV score(s) for the target website and the SEV score(s) for the competitor(s) over the predetermined time period in block 316. The output can include visual depictions, such as graphs, indicating change in SEV scores, SEV, and/or search volume over one or more time periods for the target website and the competitor(s) website(s). Refer to FIG. 4A for further discussion about such visual depictions.

The computer system may then perform one or both of blocks 318 and 320. For example, the computer system can return the output for presentation in one or more GUIs in block 318. Refer to FIG. 4A for further discussion. The computer system can additionally or alternatively store the comparison and/or the SEV score(s) for the competitor(s) in association with the target website for the predetermined time period (block 320). The stored information can then be retrieved and used at another time to re-compute SEV scores for the target website and/or the competitor(s) website(s). The stored information can also be retrieved at another time to re-compute and/or update historical competitor analysis between the target website and the competitor(s) website(s). Refer to the process 250 of FIGS. 2C and 2D for further discussion about re-computing and updating historical SEV scores and historical analyses.

FIG. 4A illustrates a graphical user interface (GUI) 400 for presenting information about an activity plan for a target website, including SEV metrics. The GUI 400 can include a selectable input field 402 (e.g., a drop-down menu) for selecting a particular webpage for which to view an associated activity plan. The GUI 400 can include a table 404 for displaying relevant information about the activity plan of the selected webpage. For example, the table 404 can indicate how many keywords are associated with the activity plan of the selected webpage, an average position of those keywords (and whether the average position has gone up or down and by how many points), a total search volume (and whether the total search volume has gone up or down and by how many points), and an estimated traffic (and whether the estimated traffic has gone up or down and by how many points).

As described in reference to the process 200 of FIGS. 2A and 2B, the average position and total search volume metrics in the table 404 can be provided to the computer system by third party systems. Sometimes, the average position and the total search volume can be determined by the computer system based on processing raw position and search volume data that the computer system receives from the third party systems. The estimated traffic can be determined by the computer system (refer to block 218 in the process 200 of FIGS. 2A and 2B) based on raw data received from the third party systems.

The GUI 400 can include a graphical element 406 illustrating an SEV score that has been determined for the activity plan of the selected webpage using the process 200 of FIGS. 2A and 2B and/or the process 250 of FIGS. 2C and 2D. The graphical element 406 can be a circle. The graphical element 406 can include text indicating the current SEV score, whether the SEV score has gone up or down since a last time that the SEV Score was computed, and/or by how many points the SEV score went up or down.

The GUI 400 can include graph 408 to benchmark competitor analyses. The graph 408 can be unbounded. Sometimes, the graph 408 can include a reference value, which can be the competitor's or the target website's comparison to a historical SEV score (e.g., the historical SEV score of the competitor, the historical SEV score for the target website). That reference value can be search volume, in some implementations.

Figure 4B:
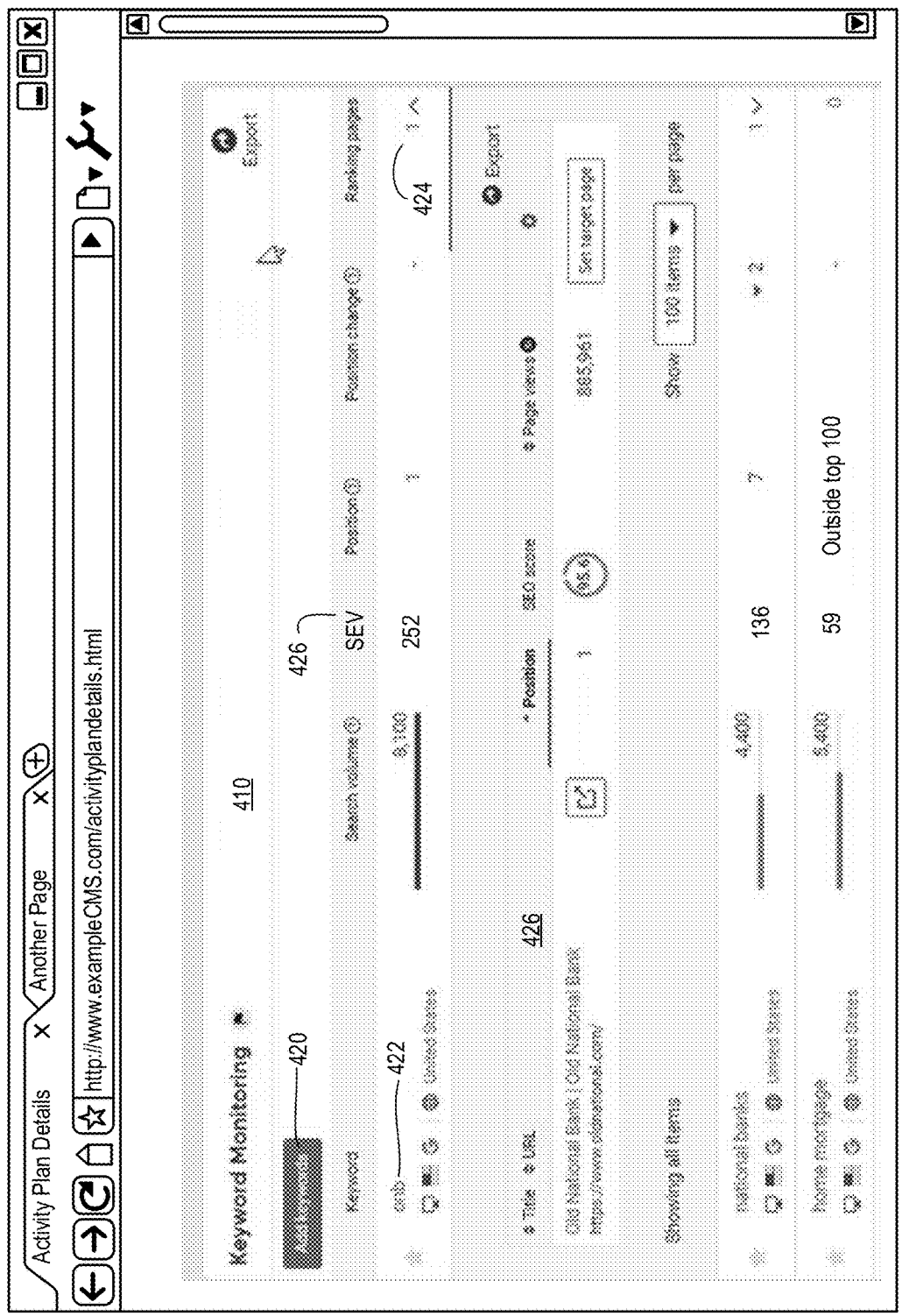

The GUI 400 can include a table 410 for keyword monitoring. The table 410 can list all keywords associated with the activity plan of the selected webpage. The table 410 can indicate, for each keyword, a respective search volume, position, position change, and ranking page(s). The position and search volume can be shown in the table 410 since those can be critical metrics for reporting on and understanding keyword SEV. Sometimes, the table 410 can also include, for each keyword, a respective SEV score. Refer to FIG. 4B for further discussion about the keyword monitoring table 410.

The GUI 400 may include a table 412 for content optimization. The table 412 can indicate overall progress in updating/optimizing content associated with the activity plan for the selected webpage. For example, the table 412 can list keywords, their respective search volumes, target page identifiers/URLs, and page issues. A relevant user can view rows in the table 412 to prioritize fixing the pages having issues associated with the keywords. By fixing these pages, the overall target website can be improved, which can result in increased search volume, keyword position/ranking, SEV, and/or SEV scores. In the example table 412, each of the 3 listed keywords have 4 content issues in which keywords are not mapped to the respective pages. The relevant user can select any of these issues presented in the table 412 to load another GUI at the user's computing device (e.g., part of a content management service provided by the computer system described herein) and resolve the issue(s). Once the issue(s) is resolved, the computer system can automatically update the table 412 reflected in the GUI 400 to show progress made on optimizing content in the target website.

FIG. 4B illustrates the table 410 for keyword monitoring information shown and described in the GUI 400 of FIG. 4A. The table 410 can include a selectable option (e.g., button) 420 for adding keywords to the associated activity plan of the selected webpage described in FIG. 4A. In the example of FIG. 4B, the table 410 includes at least a keyword 422, an SEV score 427, and a ranking pages 424. The SEV score 427 can be linked to a particular page that the keyword is associated with. The SEV score 427 can also be a general SEV score for the keyword, regardless of what pages the keyword may be linked to. The SEV score 427 for all the keywords in the table 410 can be combined (summated, aggregated) to achieve the SEV score shown by the graphical element 406 in the GUI 400 of FIG. 4A. The table 410 also include search volume and position information, as described in FIG. 4A.

The relevant user can select the keyword 422 to view additional information about the keyword 422 in the table 410, as shown in FIG. 4B. The additional information can be presented in a sub-table 426. The sub-table 426 can be embedded in the table 410. The sub-table 426 can include information such as a URL, title, or other identifier for a webpage that is mapped to the keyword 422, a position of the keyword for that webpage, an SEO score, and a quantity of page views. The sub-table 426 can also include one or more selectable options to set the webpage as a target page for the keyword 422. The sub-table 426 can present such information for each ranking page 424 that is associated with the keyword 422. The number of ranking pages 424 can factor into the formula for determining the SEV scores described herein. Additionally, the ranking or position of a keyword can depend on a landing page that is used for the keyword, which is why the relevant user may desire to change the target page for the keyword 422 based on the information presented in the sub-table 426. For example, the relevant user may desire to identify the best ranking page for the keyword 422 and set that identified page as the target page for the keyword 422. Doing so may improve search volume and/or keyword position data, thereby improving the SEV and/or SEV score for the keyword 422.

Figure 4C:
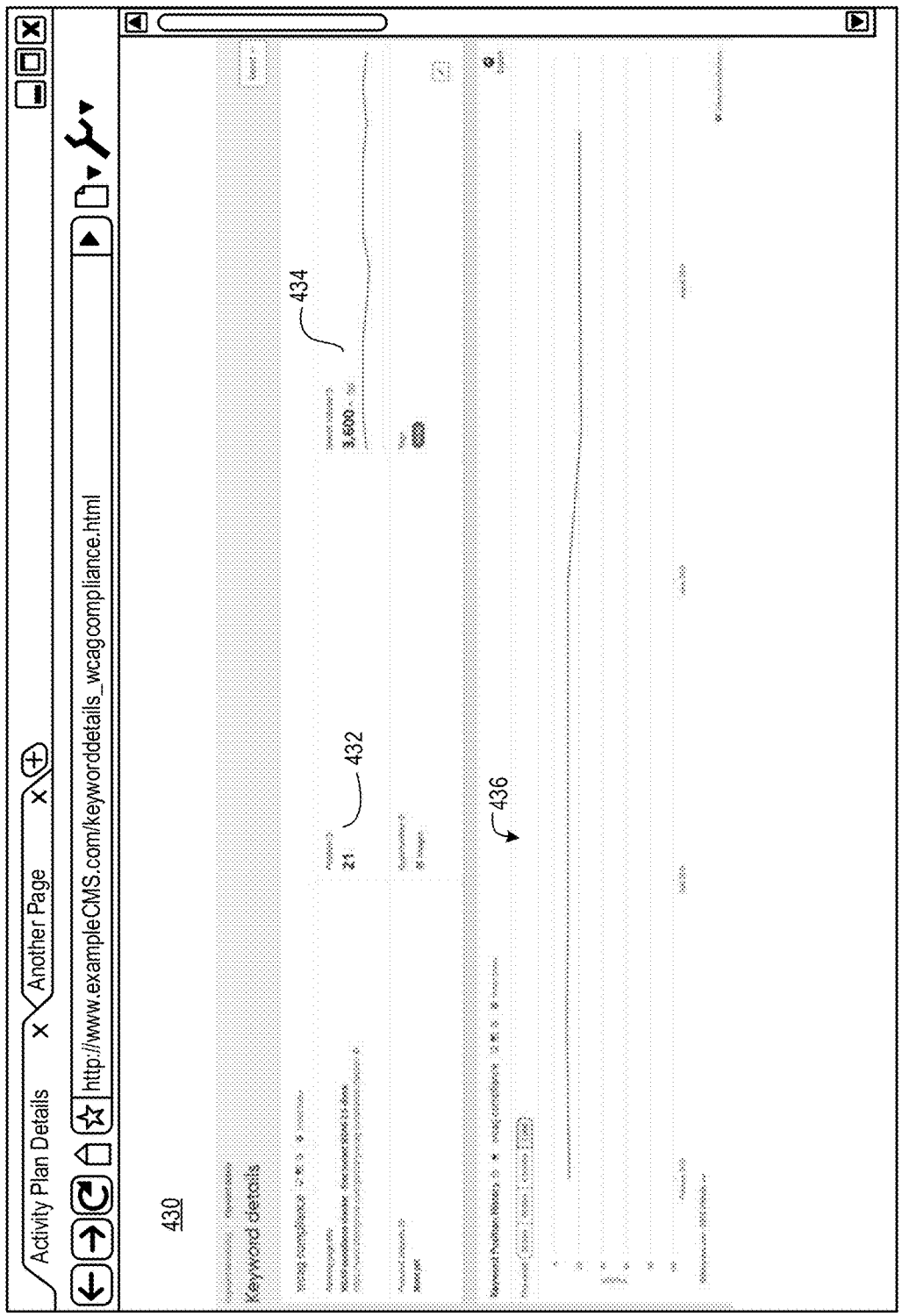
FIG. 4C illustrates a GUI for presenting information about a keyword for a target website, including keyword position and search volume data.

FIG. 4C illustrates a GUI 430 for presenting information about a keyword for a target website, including keyword position 432 and search volume 434 data. Advantageously, SEV can be combined across groups of keywords, or activity plans, for an overview of progress for the entire group of keywords. Because the combined SEV score and SEV may not scale in a similar way when combining information associated with multiple keywords (e.g., the entire group of keywords), a preferred way to visually understand why the SEV and/or combined SEV score changes over time can include visually displaying the position 432 and the search volume 434 for a particular keyword.

In the example GUI 430, the keyword being displayed is 'wcag compliance.' The keyword has the position 432 of 21 and the search volume 434 of 3,600, which is up 700 since a previous time that search volume was computed for the keyword. The search volume 434 can also include a graph or similar visualization that depicts the change in search volume over some predetermined time period for the particular keyword. The graph for the search volume 434 can illustrate changes over time in search volume for a particular search query, which can provide a reference point to understand how the search volume may or may not impact other values, such as the SEV and/or SEV scores for a group of keywords or the particular keyword.

The GUI 430 can also include a graph 436 for displaying how keyword position changed over some predetermined time period. In some implementations, the predetermined time period can be the same for both the search volume 434 graph and the graph 436. In some implementations, the predetermined time periods can be different for the search volume 434 graph and the graph 436.

A relevant user can easily compare the search volume 434 graph with the graph 436 to spot and understand where a change might have occurred at some point in time regarding the keyword 432 and/or the search volume 434. As a result, the user can identify where and how that change lead to a change in the overall SEV for a group of keywords, or activity plan, which includes the particular keyword. Although the user may be interested to identify how changes in the search volume 434 can impact the overall SEV for the group of keywords, the user may focus on changes in the keyword position 432, as shown by the graph 436, since the change in keyword position is something that the user can impact/change. On the other hand, search volume 434 typically may remain relatively unchanged over extended time periods for most keywords (unless, for example, a particular keyword is suddenly trending and/or seasonal).

FIG. 5A illustrates a GUI 500 for presenting information about activity plans for a target website. The GUI 500 can include a field 502 indicating total keywords being monitored across activity plans (including an indication of whether the total has increased or decreased and by how much). The GUI 500 can include a field 504 indicating average SEV across the activity plans (including an indication of whether the average SEV has increased or decreased and by how much).

The GUI 500 can include a table 506 for viewing information about all the activity plans associated with the target website. The table 506 may include a selectable option (e.g., button) 508 to create or add one or more activity plans. Refer to FIG. 5B for further discussion about creating the activity plans. The table 506 can include information such as, for each activity plan, a number of keywords, search competitors, SEV 510, and change in visibility. The SEV 510 can be a composite SEV score on the activity plan level. The SEV 510 can therefore show an aggregated impact of keywords for the activity plan level, from a high level. As an illustrative example, the SEV 510 can indicate how accessibility webpages of the target website perform relative to competitors that are associated with the particular activity plan (the activity plan being linked to accessibility webpages).

The contents of the table 506 can be filtered and/or sorted using filtering options 512 (e.g., based on competitor, based on SEV, based on change in visibility, based on number of keywords). Additional or other information may also be presented in the table 506. The information presented in the table 506 can be used by the relevant user to view comparisons between activity plans of the target website and between the target website and competitors. Selecting any of the entries in the table 506 can cause the GUI 400 of FIG. 4A to be presented at a computing device of the relevant user.

FIG. 5B illustrates a GUI 520 for creating an activity plan for a target website. As described herein, a relevant user can create different types of activity plans. Activity plans are synonymous with types of queries or process workflows to be performed to update and/or change one or more aspects of the target website. The user can provide input in the GUI 520 that can be saved as a new activity plan. The activity plan can then be executed by the computer system described herein to generate insights associated with the activity plan and track progress in improving the website.

More specifically, an activity plan is a tool that can provide a workflow for engaging with different aspects of SEO to achieve and maintain the target website goals. The activity plans can be used to monitor and improve SEV. Activity plans can also be benchmarked amongst each other based on metrics such as visibility, total estimated traffic, keyword count, and average keyword position. The user can customize activity plans for traffic in specific geographic regions, types of users or groups of users, specific products available on the website, and/or technical aspects of SEO, like sitemaps and structured markup.

Referring to the GUI 520, the user can provide input for a name 522 and description 524 of the new activity plan. The user can also provide input for a default search location for which to monitor particular keywords associated with the activity plan, which can be based on country, state or region, and/or city. The user can provide input for a device type 528 (e.g., desktop or mobile) and search engine provider 530 (e.g., GOOGLE, BING, etc.).

The user can also select an activity plan tier 532. Each tier can provide additional features and/or flexibility. For example, the higher the tier (e.g., diamond, platinum), the more insights the user can receive per month, the more keywords the user can select for monitoring, and/or the more competitors that the target website can be searched against.

The user can also select options from dropdown menu 534 for competitors to search against. The competitors can be listed in the dropdown menu 534. The user can also select an option "Add new competitors" to manually input competitors.

The user can optionally select and/or add tags using dropdown menu 536. Adding tags can be beneficial to group activity plans together (and thus generated insights), especially when the user has many activity plans for one website.

In some implementations, the user can add one or more keywords to monitor when creating the new activity plan in the GUI 520. In some implementations, after the user selects a "Save Activity Plan" option 538, the user can add the keywords to the activity plan in another GUI presented in a web browser at the user's computing device. The user can add keywords that they would like monitored with the activity plan. Optionally, the user can add landing pages that should target those keywords.

In some implementations, the user may also add focus issues to the activity plan in the GUI 520 or another GUI. Focus issues can be specific SEO issues that the user wants to direct their efforts on addressing/optimizing. An example focus issue can be website readability. An activity plan can have one or more focus issues for which the web analysis server system can focus on providing insights. Refer to application Ser. No. 17/677,658, entitled "Website Quality Assessment System Providing Search Engine Ranking Notifications," filed Feb. 22, 2022, incorporated herein by reference in its entirety, for further discussion about generating and updating activity plans.

Figure 6:
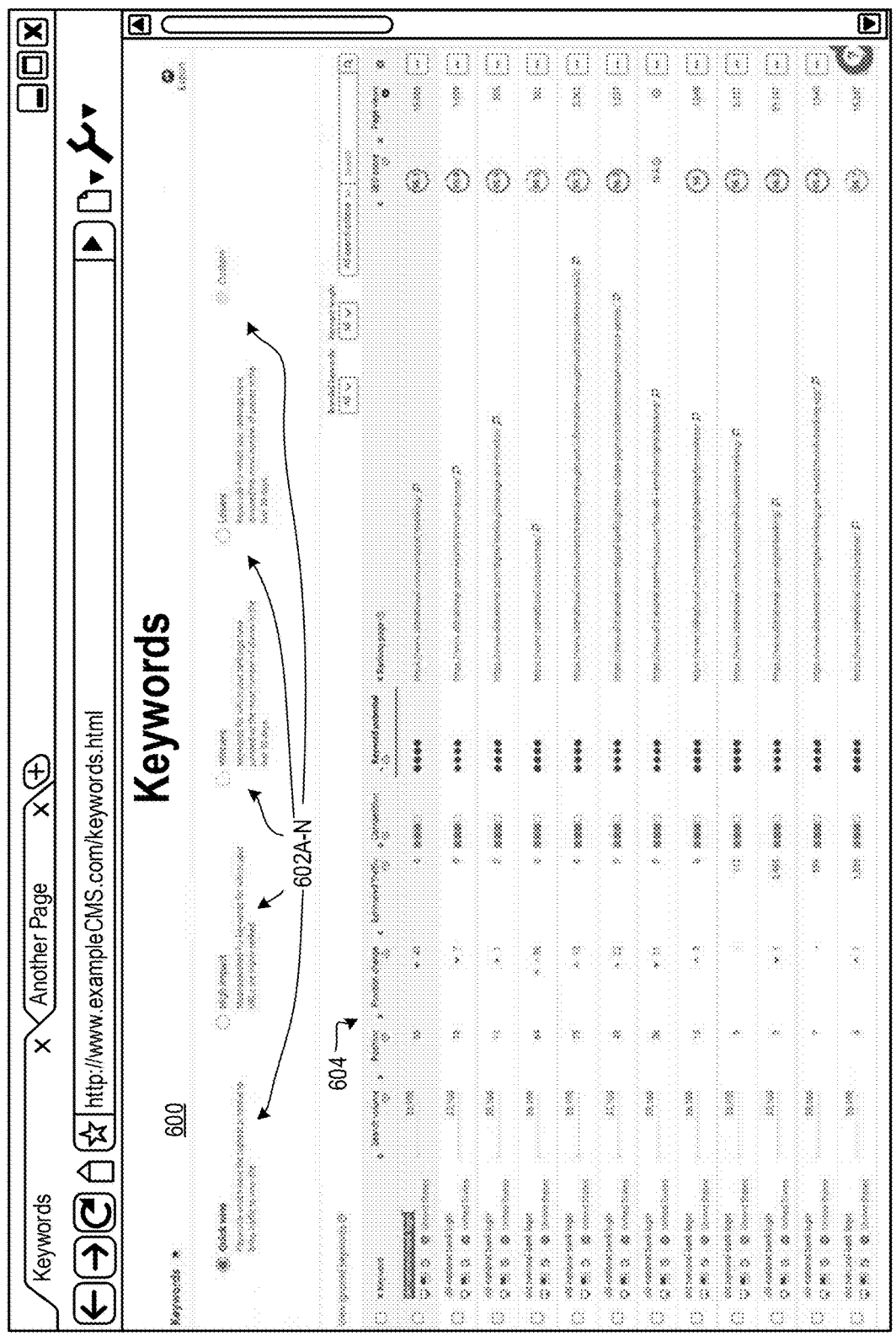
FIG. 6 illustrates a GUI for presenting and monitoring keywords for a target website.

FIG. 6 illustrates a GUI 600 for presenting and monitoring keywords for a target website. The keywords for the target website can be presented in a table 604. Entries in the table 604 can be filtered using filtering options 602A-N. For example, the table 604 can be filtered based on keywords having highest potential to bring traffic to the target website (denoted "Quick wins"). The table 604 can be filtered based on most-searched-for keywords for which the website's URLs are highly ranked (denoted "High impact"). The table 604 can be filtered based on keywords for which rankings have jumped up the most number of places over a period of time, such as a last 30 days (denoted "Winners"). The table 604 can be filtered based on keywords for which rankings have dropped the most number of places over a period of time, such as a last 30 days (denoted "Losers"). The table 604 can also be filtered based on custom criteria defined by a relevant user.

The table 604 can include, for each keyword, search volume, position, position change, estimated traffic, competition, keyword potential, ranking page, SEO score, and page views. In some implementations, the table 604 may also include SEV Score for each keyword. The table 604 can be used by the relevant user to readily add and/or update/modify keywords to one or more activity plans. More generally, the GUI 600 can be a guide to help the user work through their website and see what types of updates they can make regarding keywords and SEO. For example, keyword potential and discovery information presented in the table 604 can help the user understand whether they can improve a particular keyword and/or use the keyword on more (or higher ranking) pages in their website.

Figure 7:
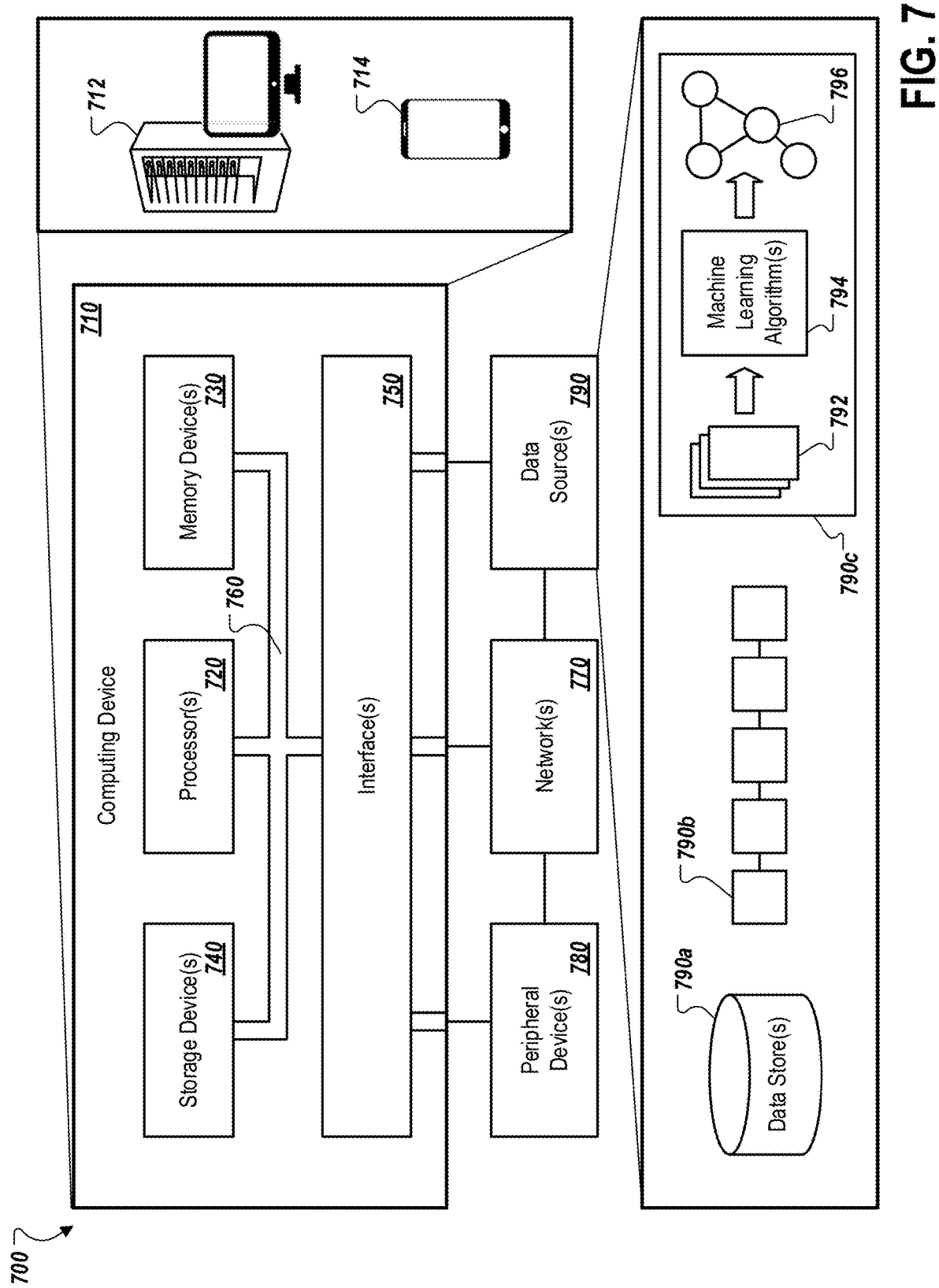
FIG. 7 is a schematic diagram that shows an example of a computing device and a mobile computing device.

FIG. 7 is a schematic diagram that shows an example of a computing system 700 that can be used to implement the techniques described herein. The computing system 700 includes one or more computing devices (e.g., computing device 710), which can be in wired and/or wireless communication with various peripheral device(s) 780, data source(s) 790, and/or other computing devices (e.g., over network(s) 770). The computing device 710 can represent various forms of stationary computers 712 (e.g., workstations, kiosks, servers, mainframes, edge computing devices, quantum computers, etc.) and mobile computers 714 (e.g., laptops, tablets, mobile phones, personal digital assistants, wearable devices, etc.). In some implementations, the computing device 710 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 710, and an entire system can be made up of multiple devices communicating with each other. For example, the computing device 710 can be part of a computing system that includes a network of computing devices, such as a cloud-based computing system, a computing system in an internal network, or a computing system in another sort of shared network. Processors of the computing device (710) and other computing devices of a computing system can be optimized for different types of operations, secure computing tasks, etc. The components shown herein, and their functions, are meant to be examples, and are not meant to limit implementations of the technology described and/or claimed in this document.

The computing device 710 includes processor(s) 720, memory device(s) 730, storage device(s) 740, and interface(s) 750. Each of the processor(s) 720, the memory device(s) 730, the storage device(s) 740, and the interface(s) 750 are interconnected using a system bus 760. The processor(s) 720 are capable of processing instructions for execution within the computing device 710, and can include one or more single-threaded and/or multi-threaded processors. The processor(s) 720 are capable of processing instructions stored in the memory device(s) 730 and/or on the storage device(s) 740. The memory device(s) 730 can store data within the computing device 710, and can include one or more computer-readable media, volatile memory units, and/or non-volatile memory units. The storage device(s) 740 can provide mass storage for the computing device 710, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 750 can include various communications interfaces (e.g., USB, Near-Field Communication (NFC), Bluetooth, WiFi, Ethernet, wireless Ethernet, etc.) that can be coupled to the network(s) 770, peripheral device(s) 780, and/or data source(s) 790 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 750 can include a control interface that receives commands from an input device (e.g., operated by a user) and converts the commands for submission to the processors 720. The interface(s) 750 can include a display interface that includes circuitry for driving a display to present visual information to a user. The interface(s) 750 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 770 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 710 can communicate with the peripheral device(s) 780, the data source(s) 790, and/or other computing devices over the network(s) 770. In some implementations, the computing device 710 can directly communicate with the peripheral device(s) 780, the data source(s), and/or other computing devices.

The peripheral device(s) 780 can provide input/output operations for the computing device 710. Input devices (e.g., keyboards, pointing devices, touchscreens, microphones, cameras, scanners, sensors, etc.) can provide input to the computing device 710 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 710 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 790 can provide data for use by the computing device 710, and/or can maintain data that has been generated by the computing device 710 and/or other devices (e.g., data collected from sensor devices, data aggregated from various different data repositories, etc.). In some implementations, one or more data sources can be hosted by the computing device 710 (e.g., using the storage device(s) 740). In some implementations, one or more data sources can be hosted by a different computing device. Data can be provided by the data source(s) 790 in response to a request for data from the computing device 710 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 790*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 790*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 790*c*. The machine learning system(s) 790*c*, for example, can be used to analyze data from various sources (e.g., data provided by the computing device 710, data from the data store(s) 790*a*, data from the blockchain(s) 790*b*, and/or data from other data sources), to identify patterns in the data, and to draw inferences from the data patterns. In general, training data 792 can be provided to one or more machine learning algorithms 794, and the machine learning algorithm(s) can generate a machine learning model 796. Execution of the machine learning algorithm(s) can be performed by the computing device 710, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for determining search engine visibility (SEV) metrics for a target website, the system comprising:
a computer system comprising a hardware processor and memory, wherein the computer system is configured to determine SEV metrics for a target website over one or more time periods, the computer system being configured to perform operations that comprise:
obtaining a group of keywords for the target website;
for each keyword in the group of keywords:
polling a third party data analytics provider for information associated with the keyword;
receiving, based on the polling and from the third party data analytics provider, the information associated with the keyword, wherein the received information includes keyword position data and search volume data;
identifying a click-through-rate (CTR) for the keyword based on processing the keyword position data and the search volume data;
determining a SEV score for the keyword based on a process comprising:
determining an estimated number of clicks for the keyword based on the keyword position data, the search volume data, and the CTR,
determining a gamification value based on a logarithmic relationship between the keyword position data and the search volume data, and
determining the SEV score based on the estimated number of clicks and the gamification value;
combining the SEV scores for the group of keywords to generate a composite SEV score for the target website; and
returning the composite SEV score for the target website.

2. The system of claim 1, wherein returning the composite SEV score comprises presenting the composite SEV score in a graphical element in a graphical user interface (GUI) displayed at a client computing device.

3. The system of claim 1, wherein:
obtaining the group of keywords for the target website comprises obtaining the group of keywords for a particular activity plan of the target website, and the composite SEV score is associated with the particular activity plan of the target website.

4. The system of claim 3, wherein returning the composite SEV score for the target website comprises presenting a comparison of composite SEV scores across different activity plans for the target website, the composite SEV scores including the composite SEV score associated with the particular activity plan of the target website.

5. The system of claim 1, wherein the one or more time periods comprises a current time period.

6. The system of claim 1, wherein the one or more time periods comprises a past time period.

7. The system of claim 1, wherein the operations further comprise:
determining a SEV score for a competitor website;
generating a competitor analysis for the target website based on the composite SEV score and the SEV score for the competitor website;
generating output that visually depicts the competitor analysis; and
returning the output for presentation in a GUI at a client computing device.

8. The system of claim 7, wherein the output comprises a graph that visually depicts, for the one or more time periods, a change of the composite SEV score for the target website relative a change in the SEV score for the competitor website.

9. The system of claim 1, wherein the operations further comprise:
receiving an indication of a triggering event to update a historical analysis of SEV scores for the target website;
receiving an indication of a past time period for the historical analysis of the SEV scores; and
re-computing one or more of the SEV scores for the target website for the past time period based on at least one of (i) one or more of the SEV scores determined for the group of keywords or (ii) the composite SEV score for the target website.

10. The system of claim 9, wherein the operations further comprise re-computing, based on the re-computed one or more SEV scores for the target website for the past time period, at least one of (i) the one or more of the SEV scores determined for the group of keywords or (ii) the composite SEV score for the target website.

11. The system of claim 9, wherein the operations further comprise updating the historical analysis of SEV scores for the target website based on the re-computed one or more SEV scores for the target website for the past time period.

12. The system of claim 9, wherein the operations further comprise:
re-computing one or more SEV scores for a competitor website of the target website for the past time period; and
generating a historical competitor analysis between the target website and the competitor website based on the re-computed SEV scores for the target website and the competitor website.

13. A method for determining search engine visibility (SEV) metrics for a target website, the method comprising:
obtaining, by a computer system, a group of keywords for a target website;
for each keyword in the group of keywords:
polling, by the computer system, a third party data analytics provider for information associated with the keyword;
receiving, by the computer system and based on the polling and from the third party data analytics provider, the information associated with the keyword, wherein the received information includes keyword position data and search volume data;
identifying, by the computer system, a click-through-rate (CTR) for the keyword based on processing the keyword position data and the search volume data;
determining, by the computer system, a SEV score for the keyword based on a process comprising:
determining an estimated number of clicks for the keyword based on the keyword position data, the search volume data, and the CTR,
determining a gamification value based on a logarithmic relationship between the keyword position data and the search volume data, and
determining the SEV score based on the estimated number of clicks and the gamification value;
combining, by the computer system, the SEV scores for the group of keywords to generate a composite SEV score for the target website; and
returning, by the computer system, the composite SEV score for the target website.

14. The method of claim 13, wherein returning, by the computer system, the composite SEV score comprises presenting the composite SEV score in a graphical element in a graphical user interface (GUI) displayed at a client computing device.

15. The method of claim 13, further comprising:
receiving, by the computer system, an indication of a triggering event to update a historical analysis of SEV scores for the target website;
receiving, by the computer system, an indication of a past time period for the historical analysis of the SEV scores; and
re-computing, by the computer system, one or more of the SEV scores for the target website for the past time period based on at least one of (i) one or more of the SEV scores determined for the group of keywords or (ii) the composite SEV score for the target website.

16. A system for determining a search engine visibility (SEV) score for a website, the system comprising:
a computer system comprising a hardware processor and memory, wherein the computer system is configured to perform operations that comprise:
obtaining a group of keywords associated with the website;
for each keyword in the group of keywords:
polling a third party data analytics provider for information associated with the keyword;
receiving, based on the polling, the information associated with the keyword;
identifying a click-through-rate (CTR) for the keyword based on the received information; and
determining a SEV score for the keyword;
combining the SEV scores for the group of keywords to generate a composite SEV score for the target website;
generating output that visually depicts the composite SEV score for the website; and
returning the output for presentation in a graphical element in a graphical user interface (GUI) displayed at a computing device.

17. The system of claim 16, wherein the received information comprises keyword position data and search volume data.

18. The system of claim 17, wherein the CTR is identified based on a combination of the keyword position data and the search volume data.

19. The system of claim 17, wherein determining the SEV score for the keyword comprises:
   determining an estimated number of clicks for the keyword based on the keyword position data, the search volume data, and the CTR;
   determining a gamification value based on a logarithmic relationship between the keyword position data and the search volume data; and
   determining the SEV score based on the estimated number of clicks and the gamification value.

20. The system of claim 16, wherein the operations further comprise:
   determining a SEV score for a competitor website;
   generating a competitor analysis for the website based on the composite SEV score and the SEV score for the competitor website;
   generating output that visually depicts the competitor analysis; and
   returning the output for presentation in the GUI displayed at the computing device.

21. A system for determining a search engine visibility (SEV) score for a website, the system comprising:
   a computer system comprising a hardware processor and memory, wherein the computer system is configured to perform operations that comprise:
      obtaining a group of keywords associated with the website;
      for each keyword in the group of keywords:
         polling a third party data analytics provider for information associated with the keyword;
         receiving, based on the polling, the information associated with the keyword;
         identifying a click-through-rate (CTR) for the keyword based on the received information; and
         determining a SEV score for the keyword;
      combining the SEV scores for the group of keywords to generate a composite SEV score for the website;
      returning the composite SEV score for the website;
      determining a SEV score for a competitor website;
      generating an analysis for the website based on the composite SEV score for the website and the SEV score for the competitor website;
      generating output that visually depicts the analysis; and
      returning the output for presentation in a graphical user interface (GUI) at a computing device.

22. The system of claim 21, wherein the second website comprises a competitor website.

23. The system of claim 21, wherein the information associated with the keyword comprises keyword position data and search volume data, and
   Wherein determining the SEV score for the keyword comprises:
      determining an estimated number of clicks for the keyword based on the keyword position data, the search volume data, and the CTR,
      determining a gamification value based on a logarithmic relationship between the keyword position data and the search volume data, and
      determining the SEV score based on the estimated number of clicks and the gamification value.

24. The system of claim 21, wherein the output comprises a graph that visually depicts, for one or more time periods, a change of the composite SEV score for the target website relative a change in the SEV score for the second website.

25. The system of claim 21, wherein the operations further comprise:
   receiving an indication of a triggering event to update a historical analysis of SEV scores for the target website;
   receiving an indication of a past time period for the historical analysis of the SEV scores; and
   re-computing one or more of the SEV scores for the target website for the past time period.

26. The system of claim 25, wherein the operations further comprise:
   re-computing one or more SEV scores for the second website for the past time period; and
   generating a historical competitor analysis between the target website and the second website based on the re-computed SEV scores for the target website and the second website.

* * * * *